(12) United States Patent
Walker

(10) Patent No.: US 11,313,219 B2
(45) Date of Patent: Apr. 26, 2022

(54) REAL-TIME MONOPOLE SONIC LOGGING USING PHYSICS-BASED ARTIFICIAL INTELLIGENCE

(71) Applicant: Halliburton Energy Services, Inc., Houston, TX (US)

(72) Inventor: Kristoffer Thomas Walker, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 291 days.

(21) Appl. No.: 16/612,531

(22) PCT Filed: Dec. 20, 2018

(86) PCT No.: PCT/US2018/066907
§ 371 (c)(1),
(2) Date: Nov. 11, 2019

(87) PCT Pub. No.: WO2020/131082
PCT Pub. Date: Jun. 25, 2020

(65) Prior Publication Data
US 2021/0148217 A1  May 20, 2021

(51) Int. Cl.
*E21B 47/002* (2012.01)
*G01V 1/50* (2006.01)

(52) U.S. Cl.
CPC ............ *E21B 47/0025* (2020.05); *G01V 1/50* (2013.01); *E21B 2200/22* (2020.05)

(58) Field of Classification Search
CPC ............................. E21B 47/0025; G01V 1/50
(Continued)

(56) References Cited

U.S. PATENT DOCUMENTS 7,089,119 B2   8/2006  Mandal
9,519,073 B2  12/2016  Mukhopadhyay et al.
(Continued)

FOREIGN PATENT DOCUMENTS

WO  2016009266   1/2016
WO  20170172792  10/2017
WO  2017205075  11/2017

OTHER PUBLICATIONS

ISRWO International Search Report and Written Opinion for PCT/US2018/066907 dated Aug. 27, 2019.

*Primary Examiner* — Albert K Wong
(74) *Attorney, Agent, or Firm* — John Wustenberg; C. Tumey Law Group PLLC

(57) ABSTRACT

A method and system for measuring a compressional and a shear slowness. The method may comprise disposing a downhole tool into a wellbore. The downhole tool may comprise a transmitter, wherein the transmitter is a monopole, and a receiver, wherein the receiver is a monopole receiver. The method may further comprise broadcasting the sonic waveform into the formation penetrated by the wellbore, recording a reflected wave on one or more receivers, wherein the reflected wave is a compressional wave or a shear wave, processing the reflected wave into at least one measurement, and applying a validation scheme to the at least one measurement. The system may be a downhole tool comprising a transmitter configured to transmit a sonic waveform into a formation, wherein the transmitter is a monopole, and a receiver configured to record a reflected wave, wherein the receiver is a monopole receiver.

27 Claims, 20 Drawing Sheets

(58) Field of Classification Search
USPC .......................................................... 367/31
See application file for complete search history.

(56) References Cited

U.S. PATENT DOCUMENTS

| | | | |
|---|---|---|---|
| 10,459,101 B2 | 10/2019 | Walker | |
| 10,983,238 B2 * | 4/2021 | Nguyen | G01V 1/42 |
| 11,112,526 B2 * | 9/2021 | Wang | G01V 3/12 |
| 2003/0058739 A1 | 5/2003 | Hsu et al. | |
| 2007/0294034 A1 | 12/2007 | Bratton et al. | |
| 2009/0192366 A1 | 7/2009 | Mensinger et al. | |
| 2018/0196156 A1 | 7/2018 | Assous et al. | |
| 2019/0368316 A1 * | 12/2019 | Bize-Forest | G06N 20/00 |
| 2020/0301036 A1 * | 9/2020 | Ramfjord | G01V 1/50 |

* cited by examiner

REAL-TIME MONOPOLE SONIC LOGGING USING PHYSICS-BASED ARTIFICIAL INTELLIGENCE

BACKGROUND

The quality of answers in acoustic logging processes are strongly influenced by the complicated nature of borehole environments. For example, low signal-to-noise ratios (SNR), interference between multiple modes (compressional refractions, shear-wave refractions, Stoneley waves, reflections from bed boundaries, tool noise, road noise, etc.) all affect the waveforms measured during acoustic logging and make it difficult to separate and identify individual waveform modes using conventional coherence processing methods. These same difficulties can make it challenging to accurately evaluate the compressional and shear slownesses of the formation, and the situation becomes even more challenging for real-time processing compared to post-processing efforts as there is very little human interaction and computing time in between continuous acquisition intervals. With traditional processing methods, the target modes and associated slownesses are often correctly identified under a range of conditions. However, for conditions outsides these ranges, the methods can fail and require manual intervention and reprocessing to obtain high-quality and reliable answers. Other methods may be successful in these troublesome ranges. Accordingly, there is a need to provide a fast, self-adaptive, and reliable acoustic logging process that works across the entire ranges of conditions, which is suitable for sonic logging in both real-time and post-processing conditions. Hybrid methods that leverage the advantages of different independent workflows can be used with artificial intelligence for this purpose.

BRIEF DESCRIPTION OF THE DRAWINGS

These drawings illustrate certain aspects of some examples of the present disclosure, and should not be used to limit or define the disclosure.

FIG. 3 illustrates a proposed workflow for estimating compressional and shear slowness;

DETAILED DESCRIPTION

Figure 1:
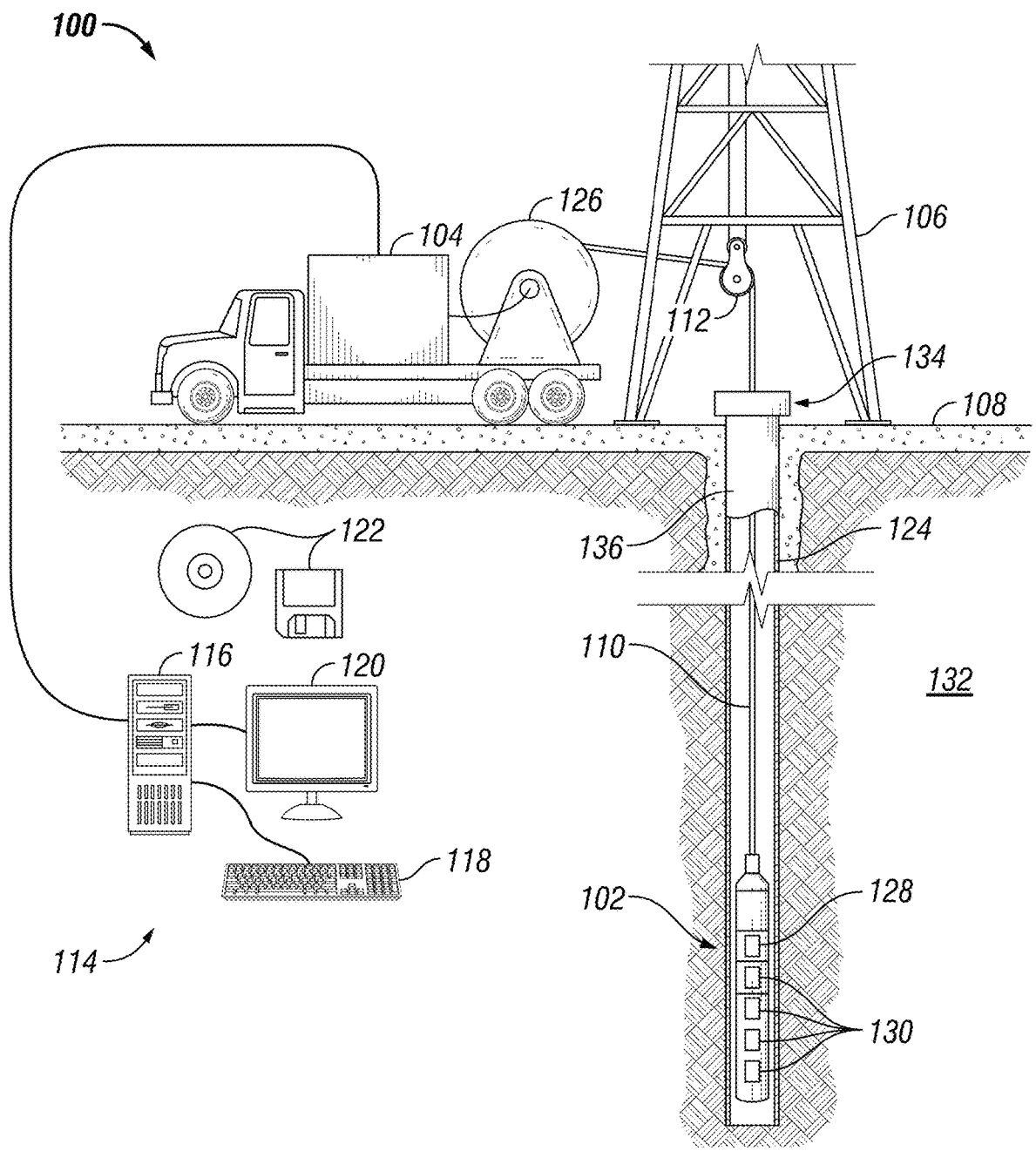
FIG. 1 illustrate an example of a borehole sonic logging system.

This disclosure may generally relate to systems and methods for measuring borehole refracted wave compressional (DTC) and shear (DTRS) slownesses, which is traditionally called "sonic logging." Measurements of DTC and DTRS provide important constraints of geophysical, geomechanical, and petrophysical properties along a borehole. These properties are sensitive to lithology, heterogeneity, porosity, stress, pore pressure, fracture density, and type of fluid occupying the pore space. Such information may be used in real-time to make drilling decisions. For example, if a slow DTC values suggest an unexpected decrease in pore pressure, due to prior depletion for example, drilling may be stopped before a hydraulic fracture and lost circulation occurs. Sonic logging may also be used in wireline scenarios, for example, to distinguish between different lithologies as well as bridge the gap in scale between vertical seismic profiling (VSP) and properties measured via analysis of cores.

Traditionally, a basic measurement from sonic logs is the compressional slowness (inverse of velocity; DTC) along the borehole created with monopole transmitters. Refracted shear slowness (DTRS) from these transmitters has also been measured to form sonic shear logs in fast formations where the formation shear slowness may be faster than the acoustic slowness of the mud in the borehole. One approach that may be used may be to make the assumption that the first arriving energy at the receivers is due to the borehole refracted compressional wave. Under this assumption, one may use a first-arrival based method to isolate the location in the waveforms of the DTC arrival.

In fast formations, both a compressional and shear wave refracts along the borehole wall. Since the refracted shear arrival's position in time and slowness may be predicted based on the DTC slowness, using first arrivals as the basis for a DTC/DTRS (appropriate Poisson's ration of solid) sonic logging method may work well under nominal conditions.

In soft formations where shear slowness cannot be measured using a monopole transmitter, the majority of the compressional signal may be highly dispersive (Leaky P arrival). The dispersive nature of leaky P may cause some algorithms to mistakenly measure a compressional slowness that may be biased slow. The first-arrival based method eliminates this issue since the leading edge of the leaky P may always be the non-dispersive component of the compressional head wave.

There may be cases, however, where conditions may not be nominal, and measuring DTC and DTRS using the first-arrival constraint may still be challenging to an operator. For example, in very hard formations or in the presence of gas the compressional signal may be weak in amplitude. Furthermore, rubbing of the tool's centralizer or stand-offs against the borehole wall may bury the DTC arrival in road noise. In such situations, the shear slowness may be stronger and because it is also usually non-dispersive, it may be mistaken for the compressional slowness. Such an apparent jump in compressional slowness may be misunderstood to be an increase in pore pressure or a transition to a slower formation.

A similar situation may happen when inside a casing or when in a borehole with large diameters. In both cases, the first arriving energy may not be the compressional refraction. Therefore, an algorithm that may adapt to these non-ideal situations may be beneficial to well operations.

An automated solution for real-time DTC and DTRS measurements that utilizes physics-guided artificial intelligence and machine learning may be utilized to overcome these problems. The automated method disclosed below may work in hard and soft formations, for boreholes of any size, and regardless of the presence of casing. Experience gained from the processing of one well may be useful to the processing of other wells where physics provides an expectation of similar geophysical and petrophysical properties, such as multiple vertical wells within the same sedimentary basin.

FIG. 1 illustrates a cross-sectional view of a borehole sonic logging system 100. As illustrated, borehole sonic logging system 100 may comprise a borehole sonic logging tool 102 attached to a vehicle 104. In examples, it should be noted that borehole sonic logging tool 102 may not be attached to a vehicle 104. Borehole sonic logging tool 102 may be supported by rig 106 at surface 108. Borehole sonic logging tool 102 may be tethered to vehicle 104 through conveyance 110. Conveyance 110 may be disposed around one or more sheave wheels 112 to vehicle 104. Conveyance 110 may include any suitable means for providing mechanical conveyance for borehole sonic logging tool 102, including, but not limited to, wireline, slickline, coiled tubing, pipe, drill pipe, downhole tractor, or the like. In some embodiments, conveyance 110 may provide mechanical suspension, as well as electrical connectivity, for borehole sonic logging tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and borehole sonic logging tool 102. Information from borehole sonic logging tool 102 may be gathered and/or processed by information handling system 114. For example, signals recorded by borehole sonic logging tool 102 may be stored on memory and then processed by borehole sonic logging tool 102. The processing may be performed real-time during data acquisition or after recovery of borehole sonic logging tool 102. Processing may alternatively occur downhole or may occur both downhole and at surface. In some embodiments, signals recorded by borehole sonic logging tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to borehole sonic logging tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as a input device 118 (e.g., keyboard, mouse, etc.) and a video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

As illustrated, borehole sonic logging tool 102 may be disposed in wellbore 124 by way of conveyance 110. Wellbore 124 may extend from a wellhead 134 into a formation 132 from surface 108. Generally, wellbore 124 may include horizontal, vertical, slanted, curved, and other types of wellbore geometries and orientations. Wellbore 124 may be cased or uncased. In examples, wellbore 124 may comprise a metallic material, such as tubular 136. By way of example, the tubular 136 may be a casing, liner, tubing, or other elongated steel tubular disposed in wellbore 124. As illustrated, wellbore 124 may extend through formation 132. Wellbore 124 may extend generally vertically into the formation 132. However, wellbore 124 may extend at an angle through formation 132, such as horizontal and slanted wellbores. For example, although wellbore 124 is illustrated as a vertical or low inclination angle well, high inclination angle or horizontal placement of the well and equipment may be possible. It should further be noted that while wellbore 124 is generally depicted as a land-based operation, those skilled in the art may recognize that the principles described herein are equally applicable to subsea operations that employ floating or sea-based platforms and rigs, without departing from the scope of the disclosure.

In examples, rig 106 includes a load cell (not shown) which may determine the amount of pull on conveyance 110 at surface 108 of wellbore 124. While not shown, a safety valve may control the hydraulic pressure that drives drum 126 on vehicle 104 which may reel up and/or release conveyance 110 which may move borehole sonic logging tool 102 up and/or down wellbore 124. The safety valve may be adjusted to a pressure such that drum 126 may only impart a small amount of tension to conveyance 110 over and above the tension necessary to retrieve conveyance 110 and/or borehole sonic logging tool 102 from wellbore 124. The safety valve is typically set a few hundred pounds above the amount of desired safe pull on conveyance 110 such that once that limit is exceeded; further pull on conveyance 110 may be prevented.

In examples, borehole sonic logging tool 102 may operate with additional equipment (not illustrated) on surface 108 and/or disposed in a separate borehole sonic logging system (not illustrated) to record measurements and/or values from formation 132. Borehole sonic logging tool 102 may comprise a transmitter 128. Transmitter 128 may be connected to information handling system 114, which may further control the operation of transmitter 128. Transmitter 128 may include any suitable transmitter for generating sound waves that travel into formation 132, including, but not limited to, piezoelectric transmitters. Transmitter 128 may be a monopole source or a multi-pole source (e.g., a dipole source). Combinations of different types of transmitters may also be used. During operations, transmitter 128 may broadcast sound waves (i.e., sonic waveforms) from borehole sonic logging tool 102 that travel into formation 132. The sound waves may be emitted at any suitable frequency range. For example, a broad band response could be from about 0.2 KHz to about 20 KHz, and a narrow band response could be from about 1 KHz to about 6 KHz. It should be understood that the present technique should not be limited to these frequency ranges. Rather, the sounds waves may be emitted at any suitable frequency for a particular application.

Borehole sonic logging tool 102 may also include a receiver 130. As illustrated, there may be a plurality of receivers 130 disposed on borehole sonic logging tool 102. Receiver 130 may include any suitable receiver for receiving sound waves, including, but not limited to, piezoelectric receivers. For example, the receiver 130 may be a monopole receiver or multi-pole receiver (e.g., a dipole receiver). In examples, a monopole receiver 130 may be used to record compressional-wave (P-wave) signals, while the multi-pole receiver 130 may be used to record shear-wave (S-wave) signals. Receiver 130 may measure and/or record sound waves broadcast from transmitter 128 as received signals. The sound waves received at receiver 130 may include both direct waves that traveled along the wellbore 124 and refract through formation 132 as well as waves that traveled through formation 132 and reflect off of near-borehole bedding and propagate back to the borehole. The reflected waves may include, but are not limited to, compressional (P) waves and shear (S) waves. By way of example, the received signal may be recorded as an acoustic amplitude as a function of time. Information handling system 114 may control the operation of receiver 130. The measured sound waves may be transferred to information handling system 114 for further processing. In examples, there may be any suitable number of transmitters 128 and/or receivers 130, which may be controlled by information handling system 114. Information and/or measurements may be processed further by information handling system 114 to determine properties of wellbore 124, fluids, and/or formation 132. By way of example, the sound waves may be processed to generate a reflection image of formation structures, which may be used for dip analysis as discussed in more detail below.

Figure 2:
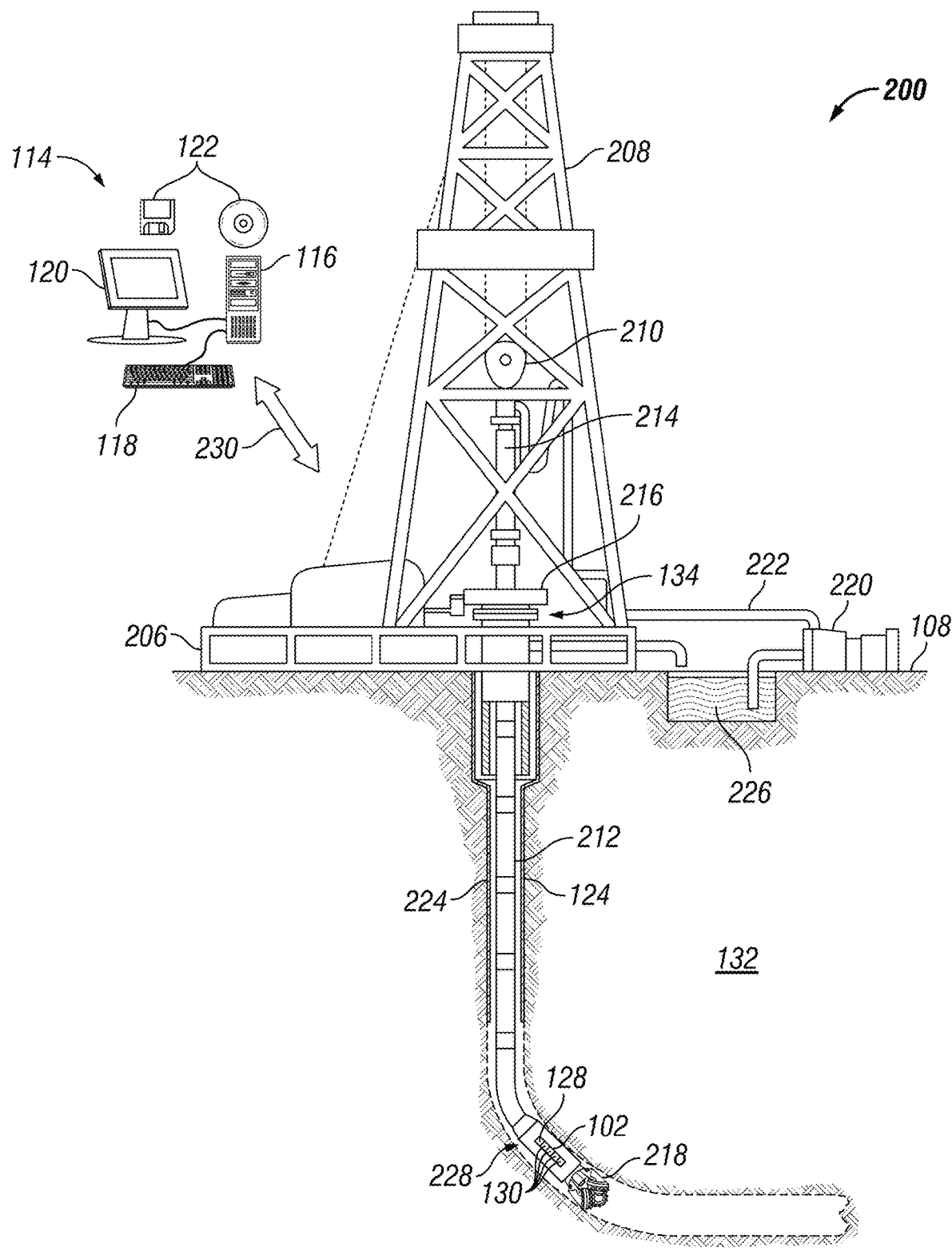
FIG. 2 illustrates an example of a drilling system.

FIG. 2 illustrates an example in which borehole sonic logging tool 102 may be included in a drilling system 200. As illustrated, wellbore 124 may extend from wellhead 134 into formation 132 from surface 108. A drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend wellbore 124 that penetrates various subterranean formations 204. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 134 and may traverse wellbore 124. Drill bit 218 may be attached to a distal end of drill string 212 and may be driven, for example, either by a downhole motor and/or via rotation of drill string 212 from surface 108. Drill bit 218 may be a part of bottom hole assembly 228 at distal end of drill string 212. Bottom hole assembly 228 may further comprise borehole sonic logging tool 102. Borehole sonic logging tool 102 may be disposed on the outside and/or within bottom hole assembly 228. Borehole sonic logging tool 102 may comprise a plurality of transmitters 128 and/or receivers 130. Borehole sonic logging tool 102 and/or the plurality of transmitters 128 and receivers 130 may operate and/or function as described above. As will be appreciated by those of ordinary skill in the art, bottom hole assembly 228 may be a measurement-while drilling (MWD) and/or logging-while-drilling (LWD) system.

Without limitation, bottom hole assembly 228, transmitter 128, and/or receiver 130 may be connected to and/or controlled by information handling system 114, which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a communication line (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive, as well as process, information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided which may transmit data from bottom hole assembly 228 to an information handling system 114 at surface 108. Information handling system 114 may include a processing unit 116, a video display 120, an input device 118 (e.g., keyboard, mouse, etc.), and/or non-transitory computer-readable media 122 (e.g., optical disks, magnetic disks) that may store code representative of the methods described herein. In addition to, or in place of processing at surface 108, processing may occur downhole.

Figure 3:
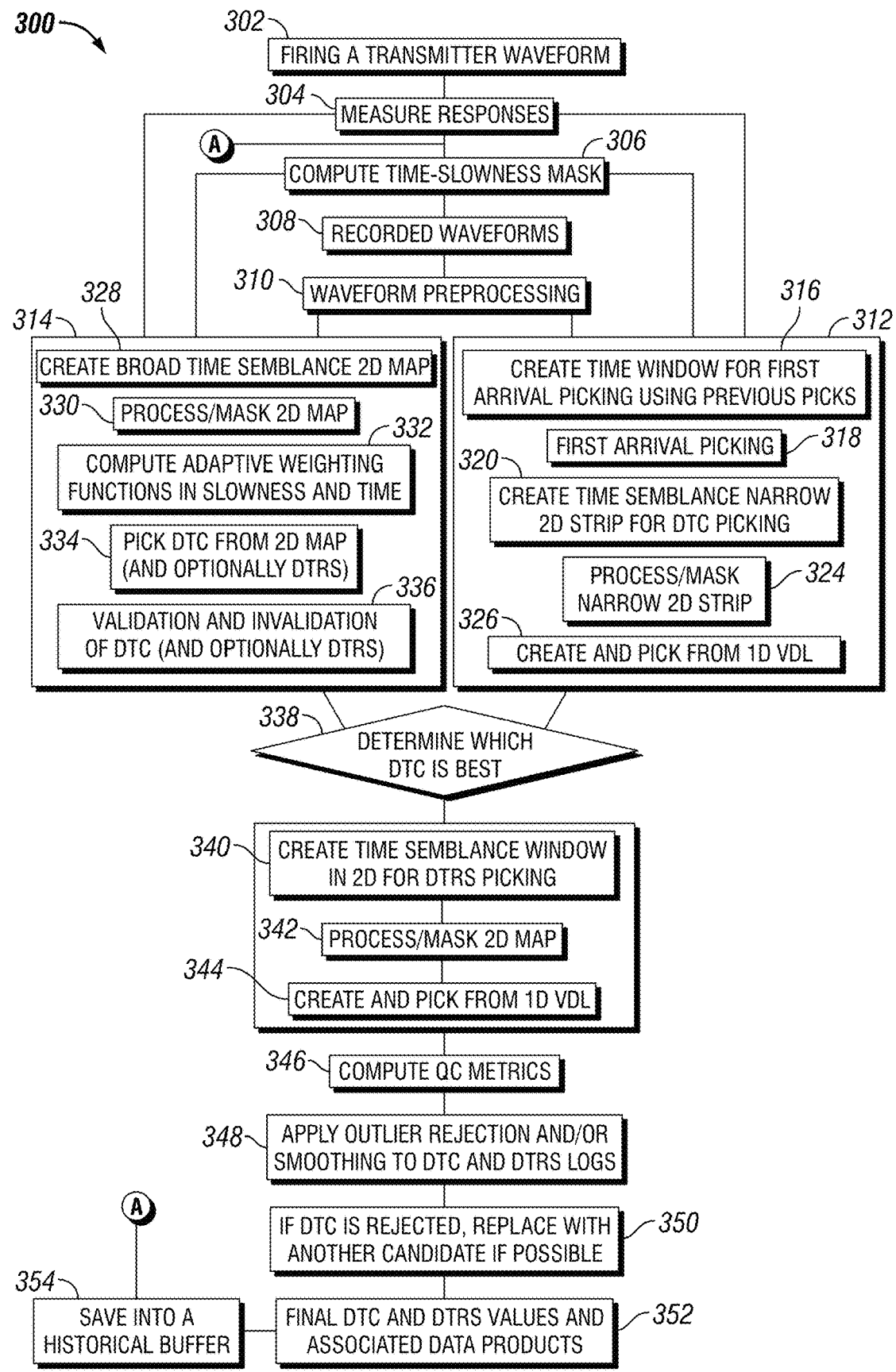
FIG. 3 illustrate an example of a borehole sonic logging tool disposed in a wellbore.

FIG. 3 illustrates the proposed workflow 300 for processing data acquired by downhole operations described in FIG. 1 or 2. The workflow has two modules that may be run in parallel a first-arrival based module 312 and a pure semblance based module 314. In examples, first-arrival based module 312 may optionally be chosen to be utilized or removed from workflow 300. Without limitation, first-arrival based module 312 may provide additional redundancy that may improve resulting data products. Workflow 300 may begin with firing a sonic waveform from transmitter 128 (e.g, referring to FIG. 1 or 2) at step 302. The sonic waveform may be fired by any platform described above in FIG. 1 or FIG. 2. In examples, sonic waveforms may be audible frequencies and may include frequencies from about 20 Hz to about 20,000 Hz. After step 302, step 304 may be implemented to measure responses which may include the reflections of sonic waveform off a formation 132.

Figure 4:
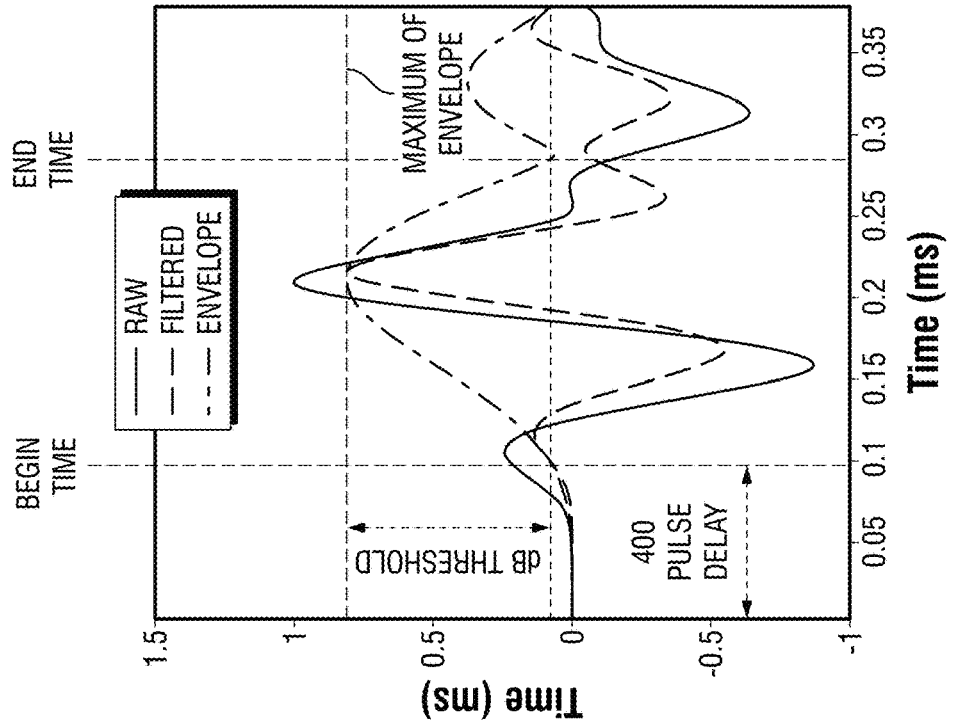
FIG. 4 is a graph illustrating a drive pulse delay measurement.

In step 304, the delay between the start of transmitter 128 (e.g., referring to FIG. 1 or 2) and a first significant energy transmitted into wellbore 124 (e.g., Referring to FIG. 1 or FIG. 2), as well as the transmitted signal duration may be measured. This may be accomplished by measuring the times at which the envelope of the filtered drive pulse drops below the maximum by some threshold percent. The threshold may be chosen by an operator and may range from about 1 percent to about twenty percent. FIG. 4 illustrates an annotated graph demonstrating how to compute pulse delay 400. Specifically, a first point is captured at the start of transmission from transmitter 128. A second point is captured at the onset of significant energy transmitted into wellbore 124. The difference between the second point and the first point is defined as pulse delay 400.

Figure 5:
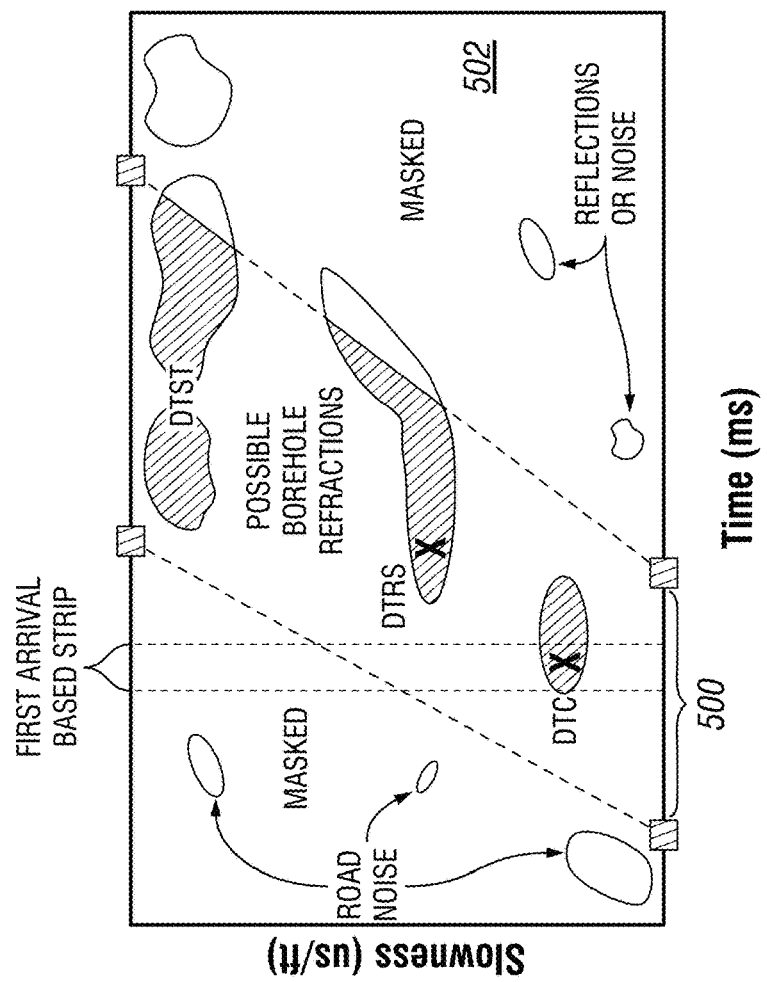
FIG. 5 is a graph illustrating a physics-based time-slowness mask (TSM)

Referring back to FIG. 3, step 306 may follow step 304 and may compute a time-slowness mask ("TSM") or filter as illustrated in FIG. 5. A TSM may be a polygon 500 in time-slowness space 502 that defines what times and slownesses may be geologically reasonable for target borehole refracted head wave. For example, for a reflection from a fracture zone within a formation 132 (e.g., Referring to FIG. 1 or FIG. 2), the apparent slowness may be realistic (e.g., 60 us/ft), but may have a later arrival time than that expected for head waves (DTC and DTRS). An operator may utilize time-slownesses that may be associated with DTC and DTRS. Such a computation may be based on the pulse delay and duration, minimum/maximum slownesses, minimum/maximum frequencies, minimum/maximum borehole diameters, and the reference receiver 130 (e.g., Referring to FIG. 1 or FIG. 2) of interest. The TSM may be computed dynamically in response to variations in borehole diameter or the history of compressional and shear slowness. These masks are defined using Snell's Law by computing the range of travel times to the reference receiver for the provided slowness range of interest assuming propagation of a refraction in a homogeneous, isotropic formation. The result may be a single travel time as a function of slowness. The TSM may be saved for a later step or steps in workflow 300.

In step 308, referring back to FIG. 3, receiver 130 (e.g., Referring to FIG. 1 or FIG. 2) may record waveforms that contain energy from compressional and shear waves that refracted along a wall of wellbore 124 (e.g., Referring to FIG. 1 or FIG. 2). In step 310 waveform processing may be performed to reduce noise and increase the signal-to-noise ratio. For each iteration, waveforms may be filtered using an appropriate bandpass filter and decimated (if necessary). As illustrated in FIG. 3, measurements of a pulse delay and time duration in step 304, a computed time-slowness mask in step 306, and processed waveforms in step 310 may be fed into different forms of computation.

For example, first arrival-based module 312 may compute the DTC estimate using the detection of the first arriving (FA) energy as a constraint. The other path may compute DTC by using pure semblance (PS) module 314. Each of the methods may have distinct advantages, which may be leveraged when picking between the two measurements for the most likely correct DTC value.

First arrival-based module 312 computations may begin with step 316. In step 316, one may create a time window for first arrival picking using previous picks. In examples, step 316 may begin by calculating a short-term average to long-term average ratio (STA/LTA) detector function, which may detect the onset times of first motion from the first arriving compressional borehole refraction. The short-term average (STA) window may be a window immediately to the right of the current time sample (into the future). The long-term average (LTA) window may be a window immediately to the left (past). The ratio may be calculated as a function of time by dividing the energy in the STA window by the energy in the LTA window. There may be some additional pre-processing that may be performed on the waveforms used for this process, and this preprocessing may include computing an envelope function and applying an adaptive maximum taper mask to clip the envelope function above a threshold magnitude.

Once a detector function may be calculated, a peak in the detector function may be designed to be associated with a first arrival picking in step 318. This may assume that the first arrival picking in step 318 may be impulsive. In examples, the detector function may have more than one peak. For example, there may be three peaks in the detector function for hard formations corresponding to DTC, DTRS, and DTST times. The DTC detector peak may be searched for inside a time window that may be based on the previous acquisition's DTC time picks or the integrated travel time based on previous DTC measurements. If no significant peak is found inside the time window, one may open up the window to include other possible arrivals such as DTRS. Therefore, if the detector function has no peak of significant energy associated with the DTC arrival, it may pick the DTRS arrival instead.

After the first arrival times may be measured for all receivers 130 (e.g., Referring to FIG. 1 or FIG. 2), a linear regression may be performed on these arrival times. If some of the measured times may be outliers from an otherwise well-defined straight line, these outliers may be removed, and the linear regression may be performed again. The linear regression may result in estimated first arrival travel times for all receivers.

The estimated first arrivals may be used in step to define the beginning of a time-slowness window for a time semblance 2-D coherence map calculation. Step 320 may create time semblance narrow 2D strip for DTC Picking. The time-slowness window may be a strip that may be narrow in time duration and long in slowness range, but still within the TSM (FIG. 5). The end of the time-slowness window may be defined using an adaptive method or a fixed time window, depending on operator-selected parameters. The adaptive method starts at the first arrival time, which may be the onset of a sinusoidal wave train. The adaptive method may move forward in time until an entire dominant period has been traversed. The end time may then be picked to be the end of the adaptive window length.

From step 320, step 324 may process and/or mask the narrow 2D strip. In step 324 a time semblance method may compute within that narrow strip a coherence map, amplitude map, and signal-to-noise ratio map. These may all be "raw" maps that may have values for all points. Each map represents a measurement of a property of the waveforms that falls along predicted linear travel time move-out curves with slopes provided by the slownesses at the times associated with a reference receiver. In examples, an algorithm used to compute the coherence of the waveforms may be the Differential Phase Time Semblance ("DPTS"). However, other semblance methods may also be used such as the slowness-time-coherence (STC) method.

The coherence, amplitude, and signal-to-noise may then be processed and additionally masked based on quality control threshold parameters input by an operator as well as the TSM mask computed earlier. The results of all masks may be applied to each map. In examples, a first map that may be masked may be an amplitude map. For example, amplitudes that may be below the global maximum by some percent may be masked and not considered in subsequent processing.

A second map to be masked may be a signal-to-noise ratio ("SNR") map. The SNR map may be computed by first computing a median value of the envelope of the time series amplitudes before the predicted first arrivals, which may measure the noise level. This may allow for a signal-to-noise ratio calculation to be performed on an amplitude map using an identified noise level, leading to a map where some contour represents the separation between noise and signal. The SNR map may then be masked for all values below an operator defined threshold. The SNR log may be used as a QC metric as it may be a direct measurement of amplitude peak prominence above the noise floor whereas coherence alone is not robust.

The third map to be masked may be a coherence map. All values below a coherence threshold may be masked. After all these masks have been defined, they may be combined with the TSM mask and applied to all maps simultaneously. The outputs of this process may be three masked coherence, amplitude, and SNR maps. The existence of a non-masked pixel therefore indicates it has passed several different QC thresholds and may be usually associated with a borehole refraction or Stoneley wave.

In step 326 an operator may create and pick from a 1D Variable Density Log (VDL). This may be a one-dimensional function that may essentially be a projection of the 2-D coherence map along a time axis. There may be two methods to use for this transformation. The simplest method is the maximum value. The problem with this method may be that it may not take advantage of the redundancy provided along the time axis. This redundancy may allow for an average along time to reduce noise as well as improve the VDL so that it may communicate more information about the shape of the detections in the 2-D map. For example, often the arrivals undulate in slowness along the non-dispersive component of the arrival (low-frequency asymptote in case of leaky P), and some form of averaging the coherence along the time window may remove these sources of VDL "jitter." Therefore, a second 1-D VDL creation method may be called a weighted averaging method that takes advantage of the redundancy along the time axis by creating a 2-D map weighting function.

Step 326 may end the first arrival-based module 312 and computation within first arrival-based module 312. In examples, a pure semblance-based module 314 forms of computation may be performed simultaneously, before, or after first arrival-based module 312 forms of computation. However, the first arrival-based module 312 forms of computation may not be performed in place of pure semblance-based module 314 forms of computation.

Pure Semblance (PS) based module 314 may begin with step 328 for creating a broad time semblance 2-D map starting at the earliest possible arrival time for a borehole refracted compressional wave and extending to the latest possible time. In step 330, the operator may process and/or mask the 2-D map. The 2-D map may be processed in the same way as discussed above, using both smoothing and masking (FIG. 5). The map may be searched for some number of candidate slowness "picks" by finding local maxima in these maps that have certain properties (squares in FIG. 5). For example, two local maxima may not be less than some threshold distance between each other. In such case, only the one with the larger coherence may be saved. Each of these local maxima represent possible candidate picks that an analyst may want to select to obtain the most accurate DTC and DTRS logs.

Figure 6:
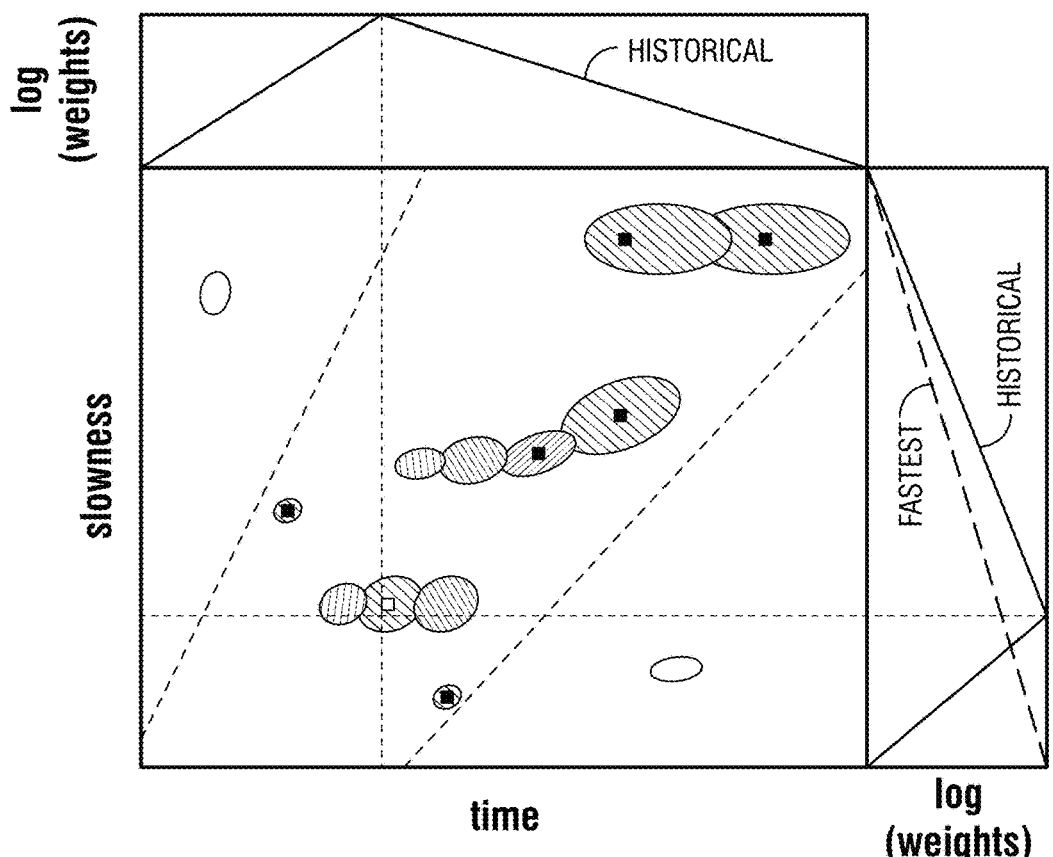
FIG. 6 is a graph illustrating the relationship between weighting functions and a time-slowness coherence 2-D map.

After step 330, in step 332 an operator may compute adaptive weighting functions in slowness and time. For example, two weighting functions may be computed that weight the raw coherence picks before selecting the final picks. These functions may be applied both in the slowness and time domains (FIG. 6). A first function is called a "lean-to" and starts as unity at the fastest possible slowness (and/or earliest time) and exponentially decays by a decade per some threshold amount. This threshold amount determines the zone within which two arrivals primary compete with each other based mostly on the difference in their coherence values. Outside of this zone, the faster of the two arrivals may always have the highest weighted coherence and be picked. The objective of the lean-to function is to generally pick the fastest of possible pick candidates that may be well separated in slowness and time from the 2-D map. This function may be what permits one to always pick the first arriving energy for dispersive arrivals without needing constraints provided by first arrival picks.

In step 334 an operator may pick a DTC from a 2D Map and optionally detecting refracted shear arrivals (DTRS) with a second type of weighting function is called a "history function." The objective of the history function may be to use simple unsupervised machine learning to help navigate through noise and continue to pick the arrival that may be consistent with previous arrivals. The history function starts as unity at some expected DTC value (such as the previous acquisition's DTC value), then decreases exponentially away in both directions again by some decade per threshold amount. The threshold amount may be calibration to real log data. The exponential nature of the function permits predictability of how the weighting may affect nearby picks. For example, any pick located in the down-dip direction farther from another pick than the threshold slowness distance may be weighted by at least one order of magnitude, regardless of the absolute slowness values. Since there may be a limited range of coherence values that go from 1 down to a coherence threshold (typically 0.2), the absolute value of the coherence does not matter for any candidates farther away in the down-dip direction than that threshold distance (their weighted coherence may never be larger than the up-dip weighted coherence). How a linear weighting function affects nearby picks may be less predictable, and the 0.2 coherence pick at faster slownesses may likely be weighted lower than the 1.0 coherence pick that may be slower.

Figure 7:
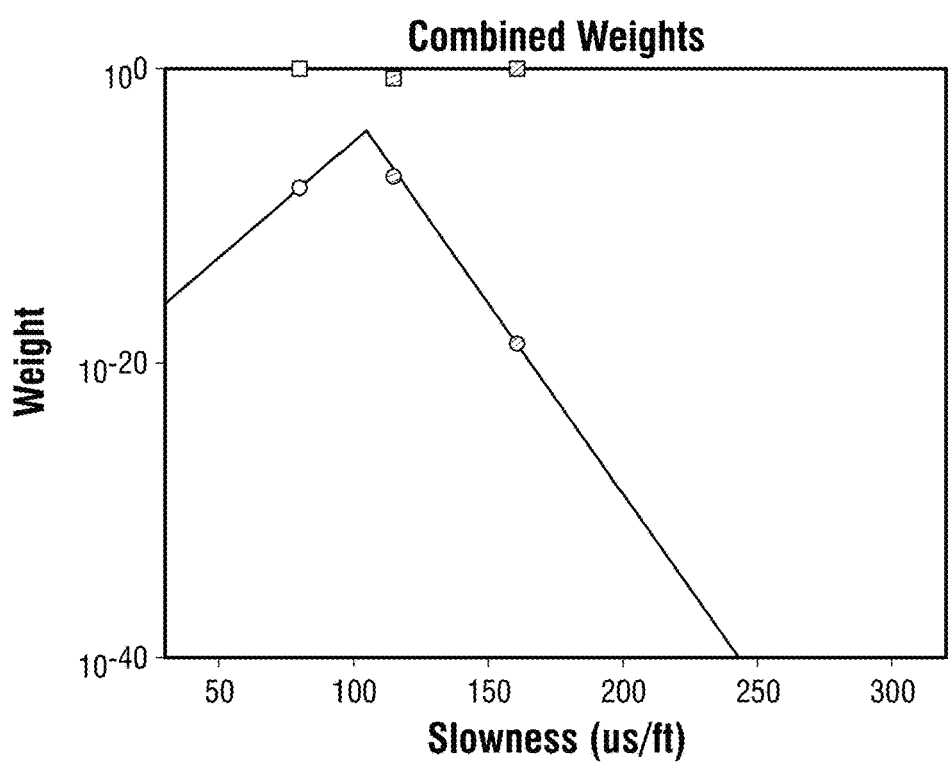
FIG. 7 is a graph illustrating a dynamic weighting function.

In step 336 a validation scheme may be implemented where a validation and invalidation of DTC and optionally DTRS may be performed. During the previous acquisition, if the previous DTC may be deemed "valid" then the history weighting function is appropriate to use with the lean-to weighting function (FIG. 7) to weight the coherences of the candidate DTC picks from the 2-D map, and the DTC may be picked from the weighed coherences in step 334. If the previous DTC may be deemed "invalid", only the lean-to weighting function may be used.

As discussed above, FIG. 7 illustrates an example of a dynamic weighting function as applied to three candidate picks with unweighted coherences from 0.2 to 1.0. Because of the log scale, the unweighted coherences may be displayed near the top weight=1 line, whereas the weighted versions may be displayed near the weighting function values (defined by the two black lines). In this quantitative example, the previous DTC of 117 us/ft was validated. Therefore, a history weighting function may be computed and modulated by a lean-to weighting function, which may be utilized to weight the coherences prior to picking. The picked value of 115 us/ft has the maximum weighted coherence (unweighted coherence is 0.2), compared with the random occurrence of noise at 80 us/ft (unweighted coherence of 1.0) or the DTRS value at 160 us/ft (unweighted coherence of 1.0).

Figure 8:
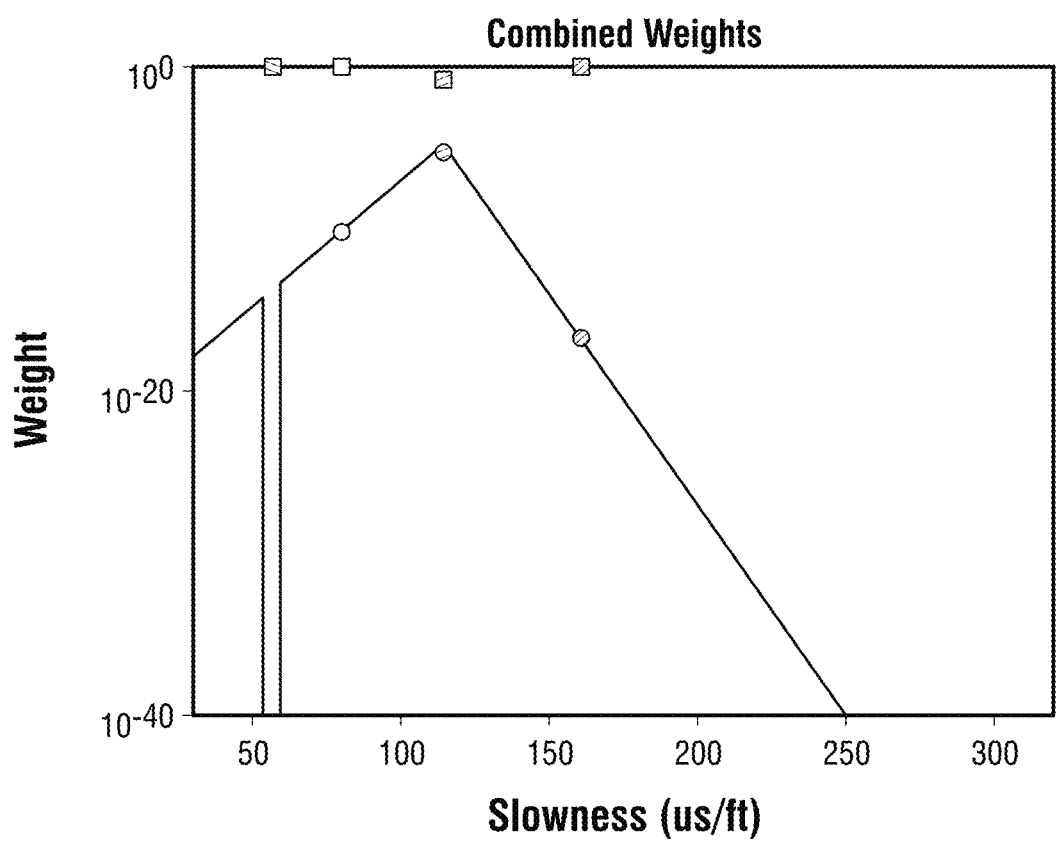
FIG. 8 is a graph illustrating a dynamic weighting function with casing present.

FIG. 8 illustrates an example of a weighting function inside casing. DTC may be picked by masking the weights across the well-known casing arrival slowness. This may be effective in many examples, but not when the casing bonding may be poor and the behind-casing formation may be fast. In such cases, the formation DTC signal may not be visible above the high-amplitude casing signal in the waveforms. This approach may also work for logging while drilling, where the collar arrival has a fairly well-known slowness range. The combined weights (AI-based history and lean-to) yield an effective strategy for picking and tracking DTC through noisy data in soft and hard formations.

Figure 9:
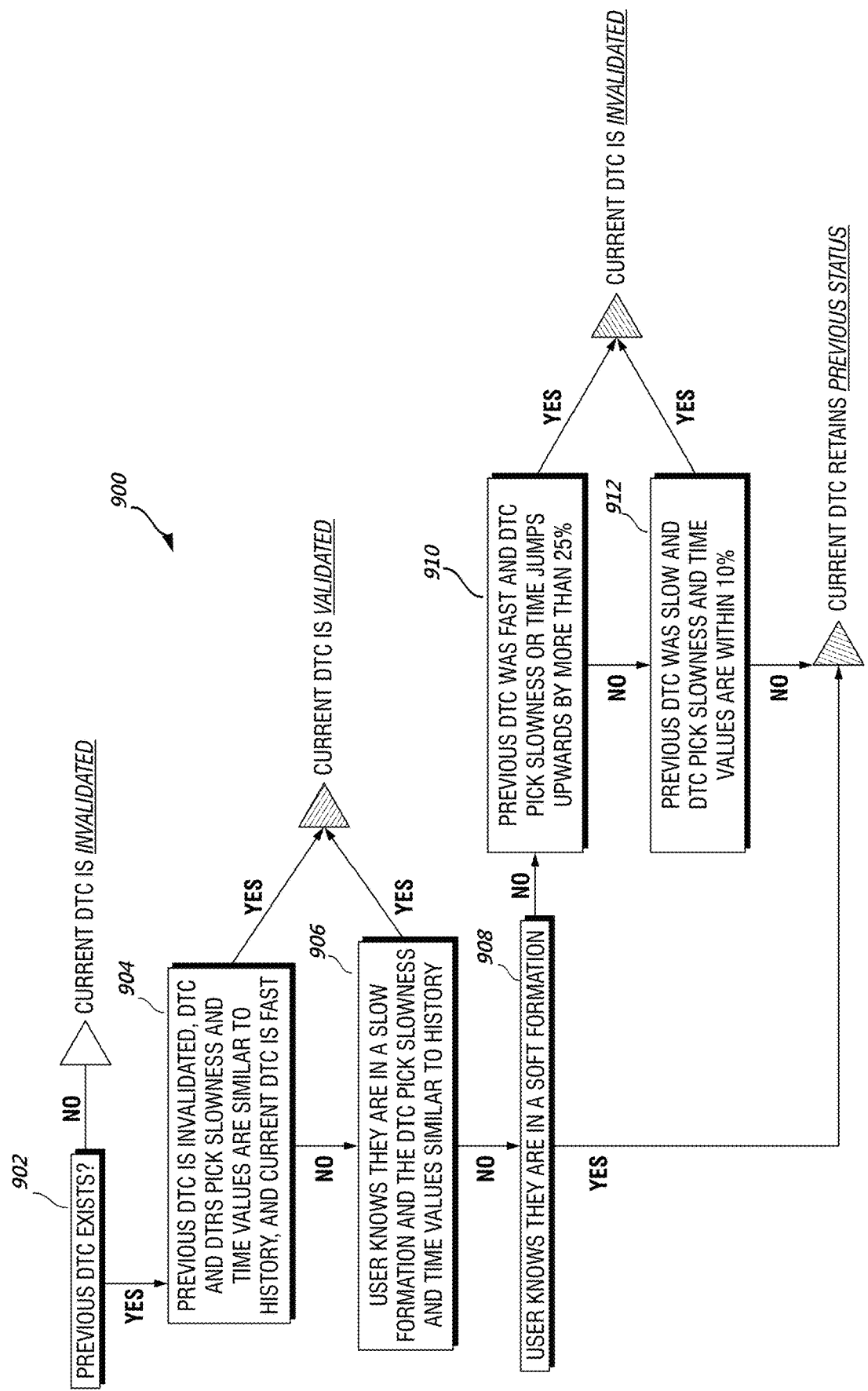
FIG. 9 is a decision tree incorporating artificial intelligence showing validation and invalidation of the current DTC measurement.

As discussed above, in step 336 the current DTC measurement may be evaluated in a validation scheme for validation status. The evaluation criteria may include knowledge available from processing previous acquisitions. For example, FIG. 9 shows a decision tree 900 incorporating artificial intelligence that validates and invalidates the current DTC measurement from the pure semblance workflow. Each condition that may be evaluated effectively provides a likelihood value. The likelihood values accumulate until they yield a total likelihood of validation (or invalidation) that may be greater than 50%, at which time the decision is made to either "validate" or "invalidation" the current measurement. The "validation" status simply means the DTC value from pure semblance may be correct. The "invalidation" status means the DTC value lacks certain criteria that would make the DTC likely correct or has certain criteria that makes the DTC likely incorrect.

Decision tree 900 begins with step 902, which determines if a previous DTC exists. If a previous DTC does not exists the current DTC is invalidated. If a previous DTC does exist, then decision tree 900 moves to step 904. Step 904 looks at three factors, a first factor looks to see if a previous DTC is invalidated, a second factor looks to see if DTC and DTRS pick slowness and time values are similar to history, and a third factor looks to see if the current DTC is fast. If all the factors are met than the current DTC is validated. If all the factors are not met then decision tree 900 moves to step 906. In step 906 additional factors are added, the first factor is if the user knows they are in a slow formation and the second factor is if the DTC pick slowness and time values similar to history. If these factors are met then the current DTC is validated. If the factors are not met then decisions tree 900 then the decision tree 900 moves to step 908. In step 908 the factor reviewed is if the user knowns they are in a soft formation. If the factor is met the current DTC retains a previous status. If the factor is not met the decision tree moves to step 910. In step 910 the factors reviewed are first if previous DTC was fast and the second factor is if the DTC pick Slowness or time jumps upwards by more 25%. If the factors are met then the current DTC is invalidated. If the factors are not met then the decision tree 900 moves to step 912. In step 912 the factors are first if the previous DTC was slow and the second factor is if the DTC pick slowness and time values are within 10%. If the factors are met then the current DTC is invalidated. If the factors are not met then the current DTC retains previous status.

The job of geophysical analysts is to make interpretations of the correct DTC value when complexities exist that generate multiple candidates. However, the same logic workflows that they use to determine the best DTC may be implemented in a series of rules, some of which adapt to the data and contents of the memory from previous acquisitions. Therefore, artificial intelligence may also be utilized to assist an operator in selecting the DTC value when multiple methods provide their own estimates. For example, an analyst generally may have the following features in mind when selecting the best DTC from candidates: fast formations may be capable of detecting refracted shear arrivals (DTRS); soft formations may be incapable of detecting DTRS; jumps in the same direction over single acquisitions in both DTC and DTRS may be likely real formation changes; DTRS has a value that is within a certain range of DTC as predicted by lab-based VpVs ratio measurements; jumps in DTC from fast to slow by an amount consistent with a valid VpVs ratio may be likely a jump from DTC to DTRS if a new DTRS pick maybe absent; and/or jumps in DTC to a faster pick may be possibly a jump to road noise or weak energy reflecting off of bed boundaries, unless DTRS jumps as well or the jump is to a persistent faster track. Each of these features has a level of importance (or weight) associated with it. If the combination of weighted features is above a certain threshold, then a decision may be made.

Figure 10:
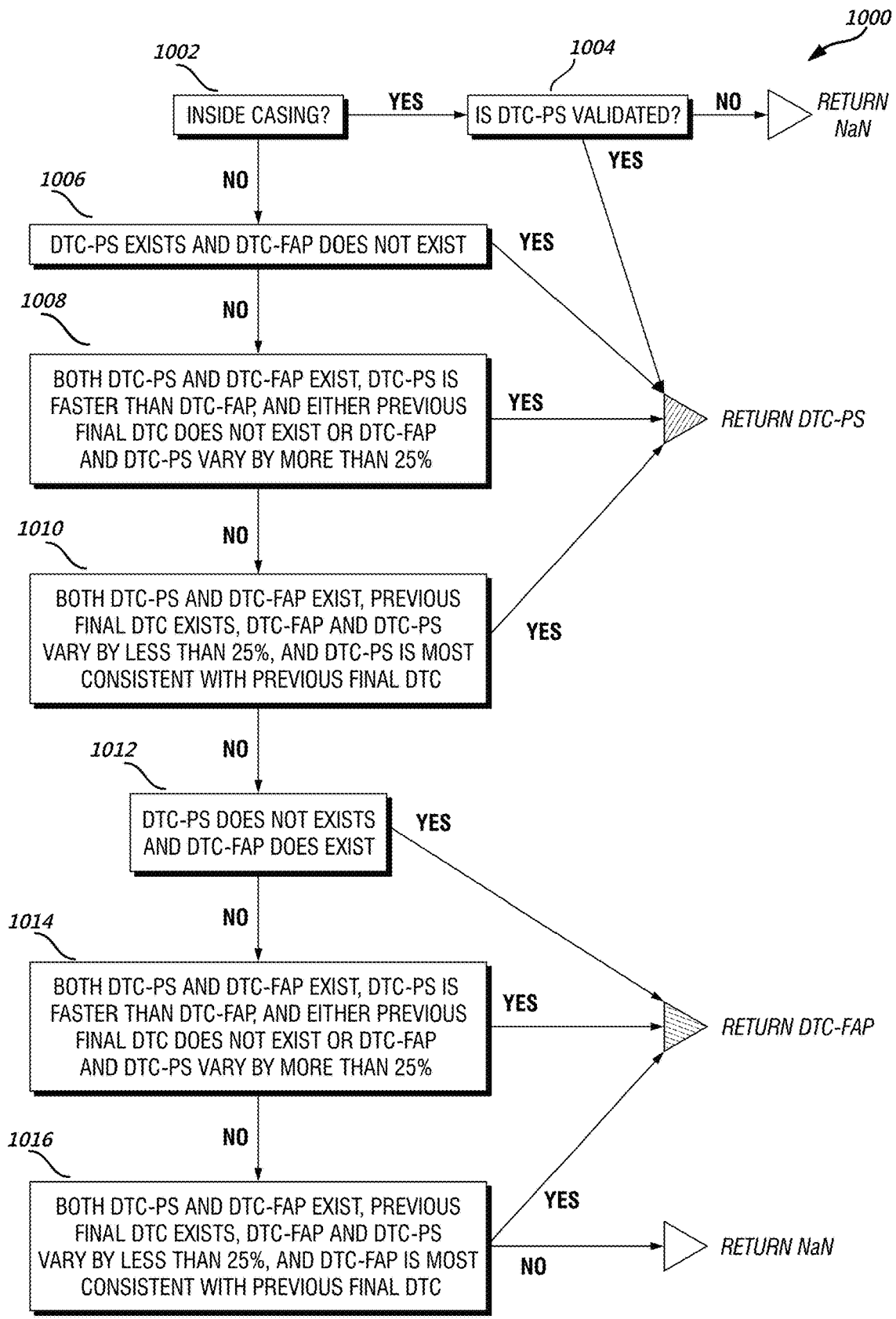
FIG. 10 is a decision tree incorporating artificial intelligence showing choosing a DTC value.

Referring back to FIG. 3, after step 336, in step 338 an operator may determine which DTC is best. Measurements may be selected using artificial intelligence from those provided by multiple methods. For example, FIG. 10 shows a decision tree 1000 that may be used to pick which DTC value may most likely be correct. There may be several different paths to the decision to select the FAP DTC, the PS DTC, or no DTC (NaN). The different weighted features may be in each conditional box. Passing from these boxes to the green triangles amounts to there being a greater than 50% chance of that associated value being the correct answer.

Decision tree 1000 may begin with step 1002. In step 1002 the factor is if the measurements are taken inside a casing. If the measurements are taken inside of a casing the decision tree 1000 goes to step 1004. If the measurements are taken out of the casing the decision tree 1006. In step 1004 the factor is if the DTC-PS is validated (e.g., referring to FIG. 9). If the DTC-PS is not validated then the decision tree 1000 returns to NaN. If the DTC-PS is validated then the decision tree 1000 returns to DTC-PS. In step 1006 the factors reviewed are first if the DTC-PS exists and second if DTC-FAP does not exist. If these factors are met then the decision tree 1000 returns to DTC-PS. If the factors are not met then the decision tree 1000 goes to step 1008. In step 1008 the factors reviewed are first if both DTC-PS and DTC-FAP exist, the second factor is DTC-PF is faster than DTC-FAP, and the third factor is if either previous final DTC does not exist or DTC-FAP and DTC-PS vary by more than 25%. If these factors are met then the decision tree 1000 returns to DTC-PS. If the factors are not met then the decision tree 1000 goes to step 1010. In step 1010 the factors are reviewed are first if both DTC-PS and DTC-FAP exist, second if previous final DTC exists, third if DTC-FAP and DTC-PS vary by less than 25%, and fourth if DTC-PS is most consistent with previous final DTC. If these factors are met then the decision tree 1000 returns to DTC-PS. If the factors are not met then the decision tree 1000 goes to step 1012. In step 1012 the factors to be reviewed are first if DTC-PS does not exists and second DTC-FAP does not exist. If these factors are met then the decision tree 1000 returns to DTC-FAP. If the factors are not met then the decision tree 1000 goes to step 1014. In step 1014 the factors reviewed are first if both DTC-PS and DTC-FAP exist, the second factor is DTC-PF is faster than DTC-FAP, and the third factor is if either previous final DTC does not exist or DTC-FAP and DTC-PS vary by more than 25%. If these factors are met then the decision tree 1000 returns to DTC-FAP. If the factors are not met then the decision tree 1000 goes to step 1016. In step 1016 the factors are reviewed are first if both DTC-PS and DTC-FAP exist, second if previous final DTC exists, third if DTC-FAP and DTC-PS vary by less than 25%, and fourth if DTC-PS is most consistent with previous final DTC. If these factors are met then the decision tree 1000 returns to DTC-FAP. If the factors are not met then the decision tree 1000 returns to NaN.

Figure 11:
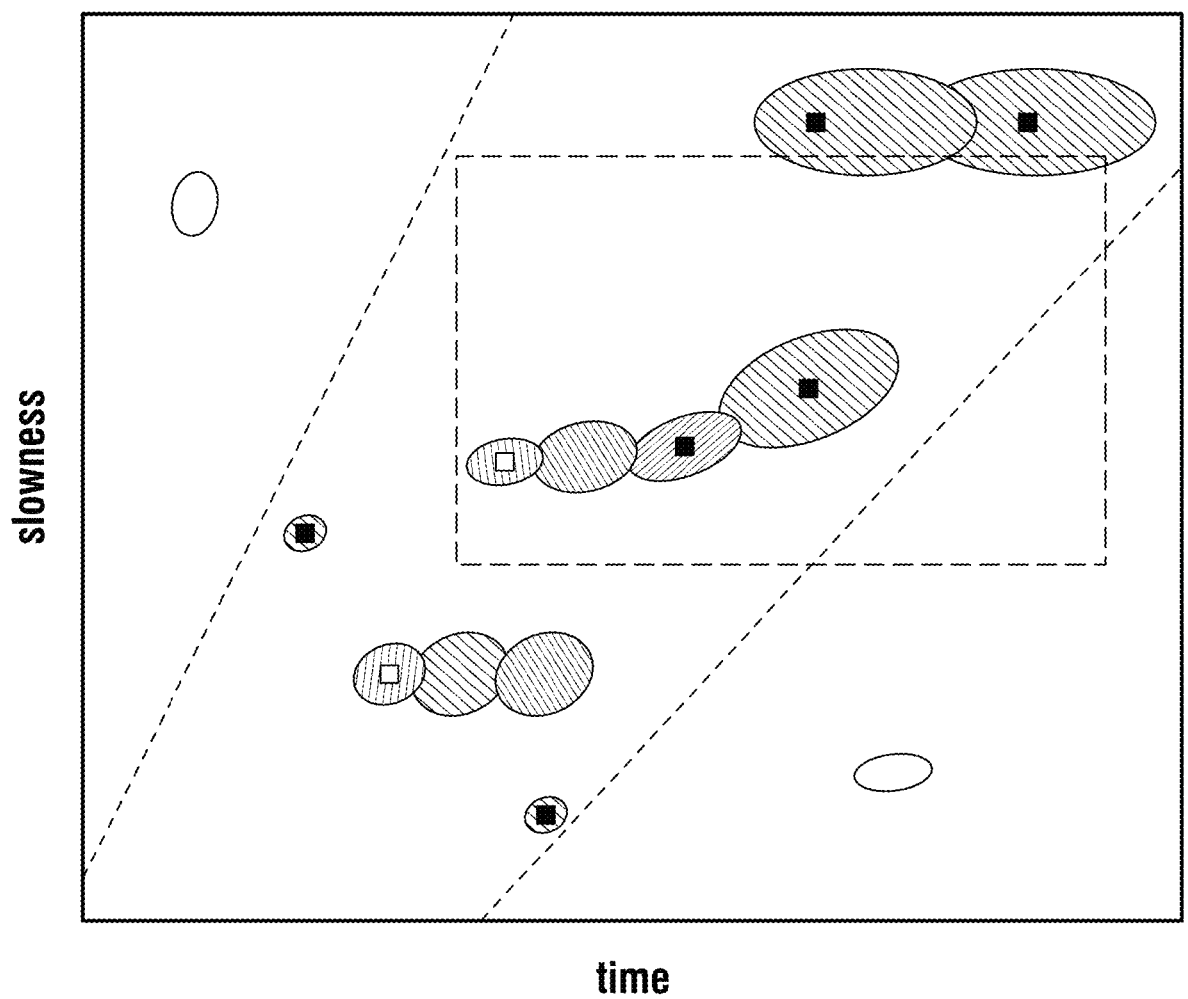
FIG. 11 is a graph with a DTRS window.
Figure 12A:
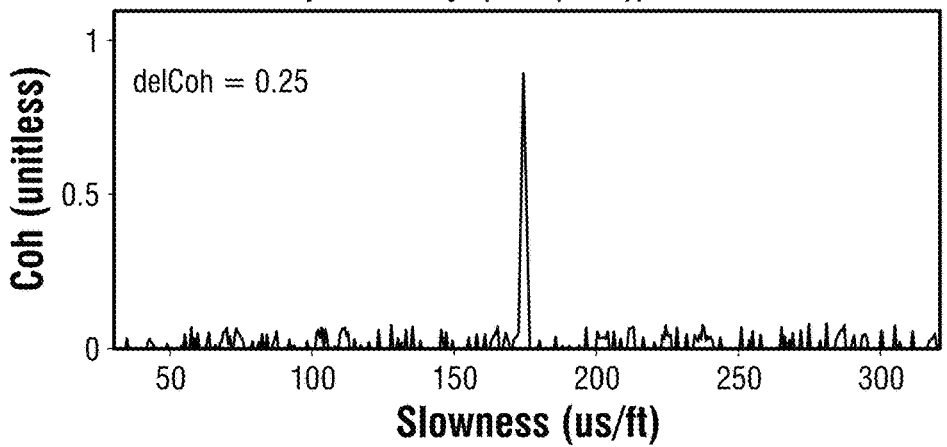
FIGS. 12A-12L are each examples of graphs for a Q-factor.
Figure 12B:
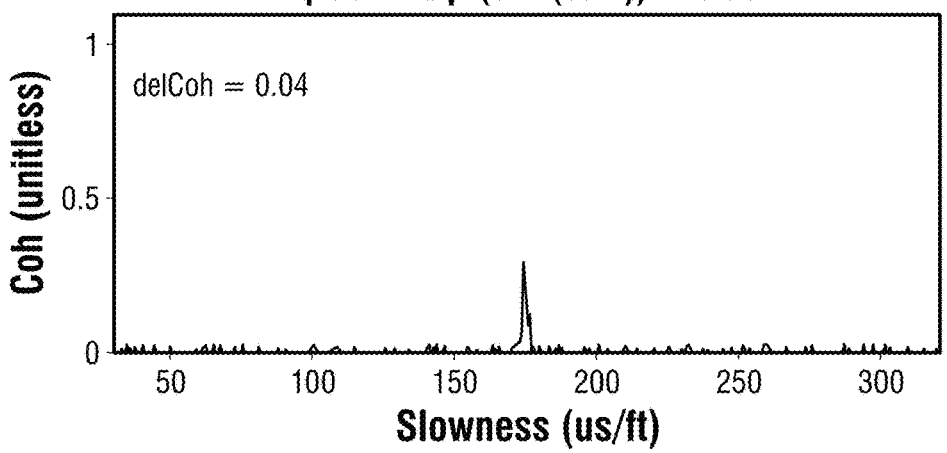
Figure 12C:
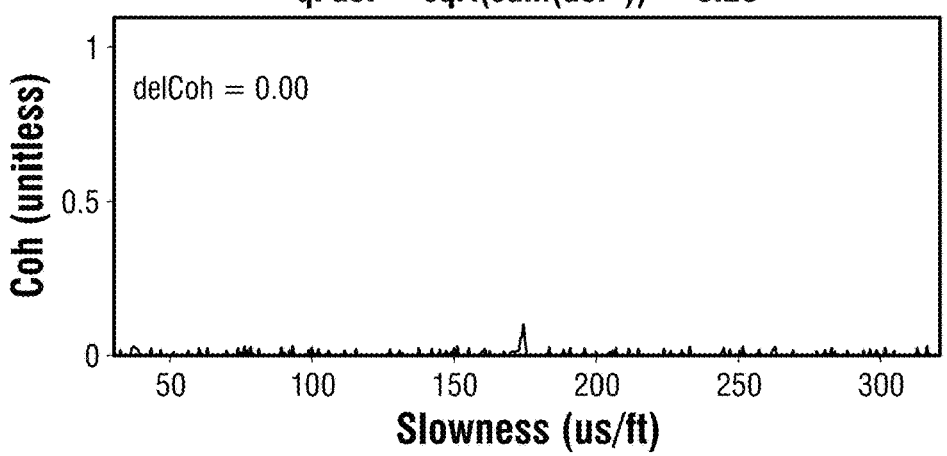
Figure 12D:
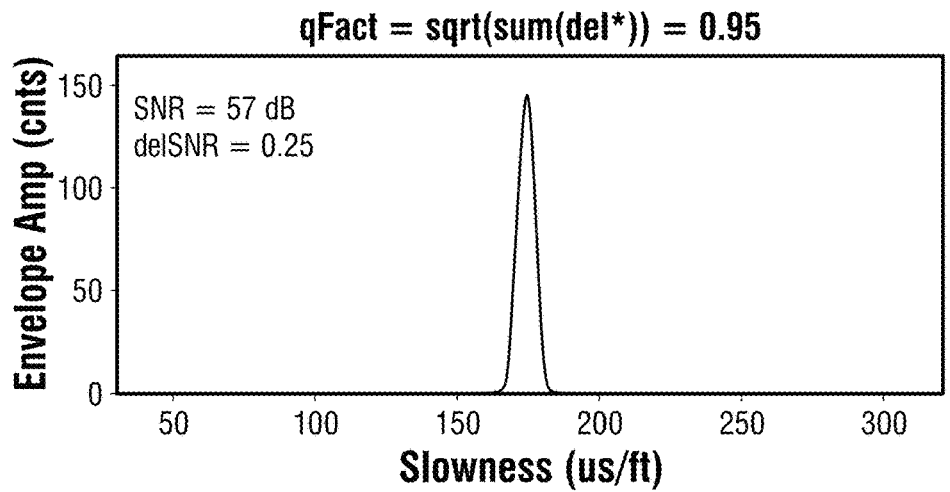
Figure 12E:
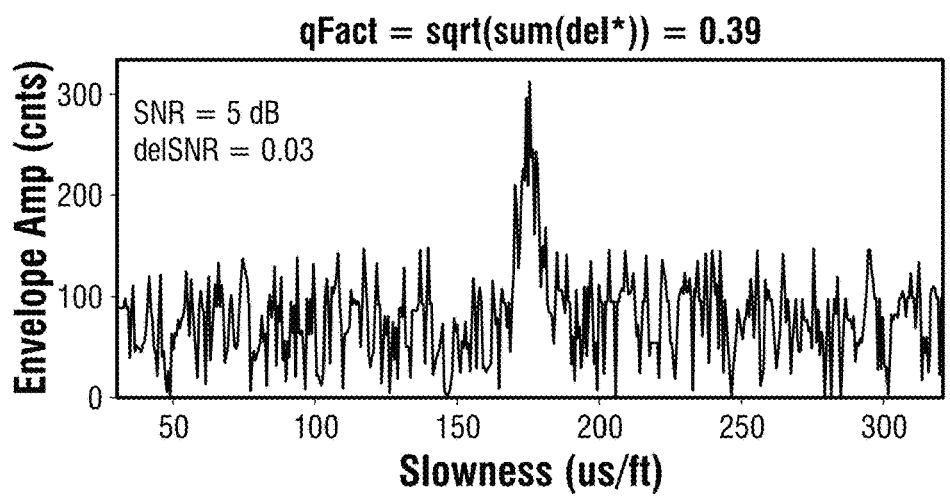
Figure 12F:
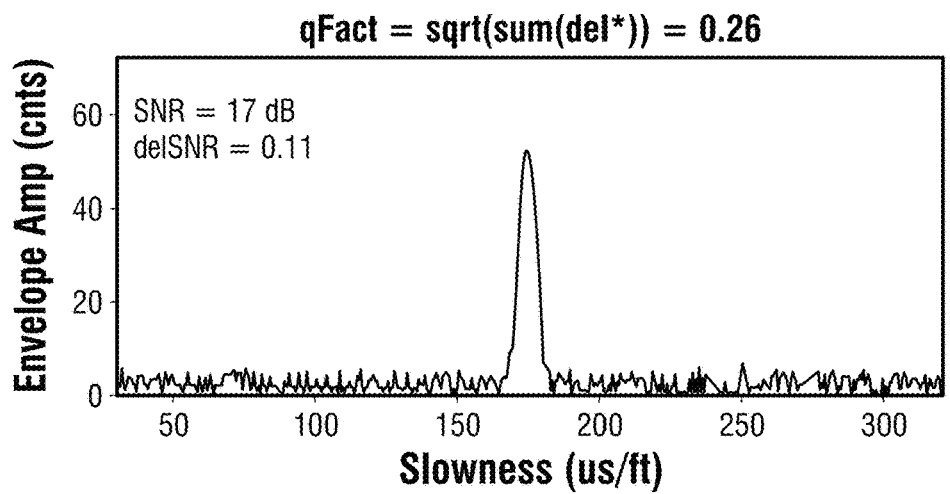
Figure 12G:
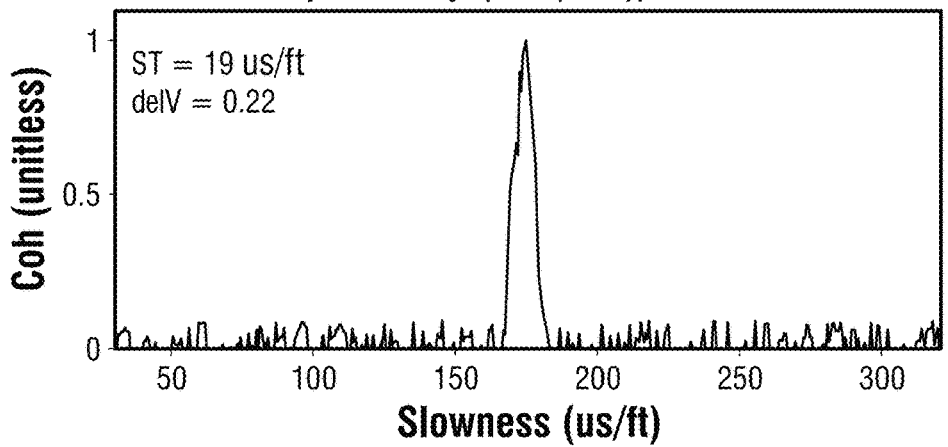
Figure 12H:
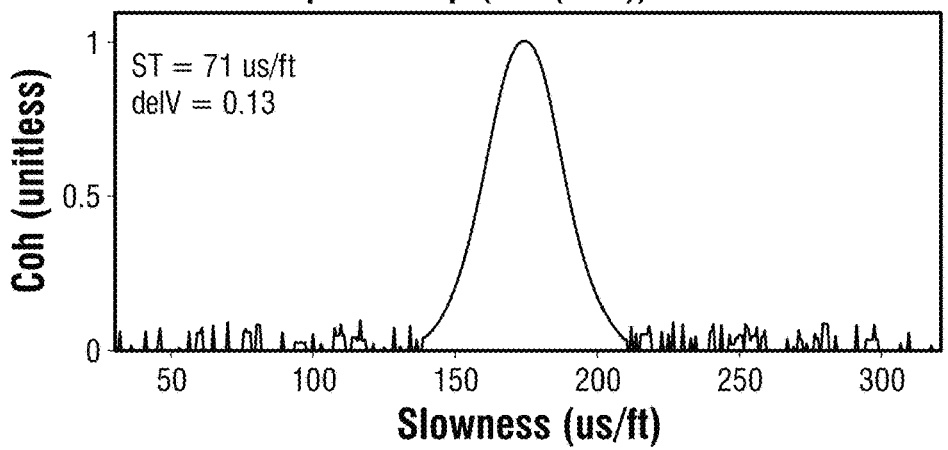
Figure 12I:
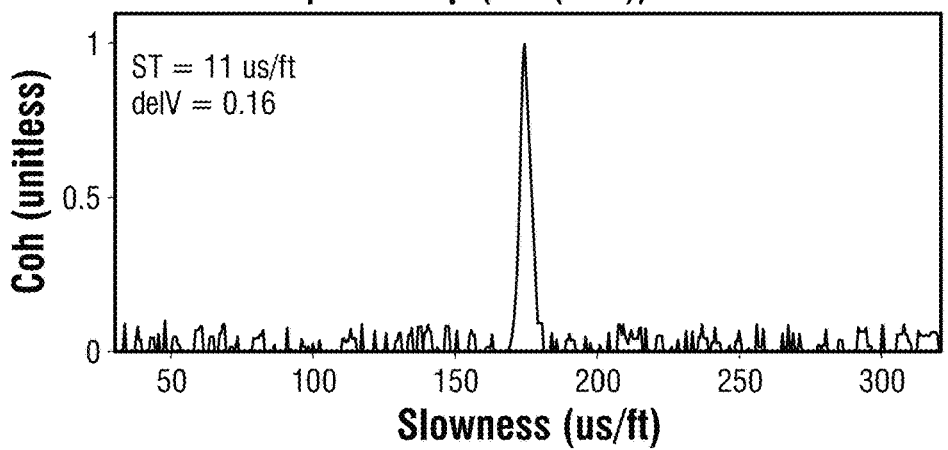
Figure 12J:
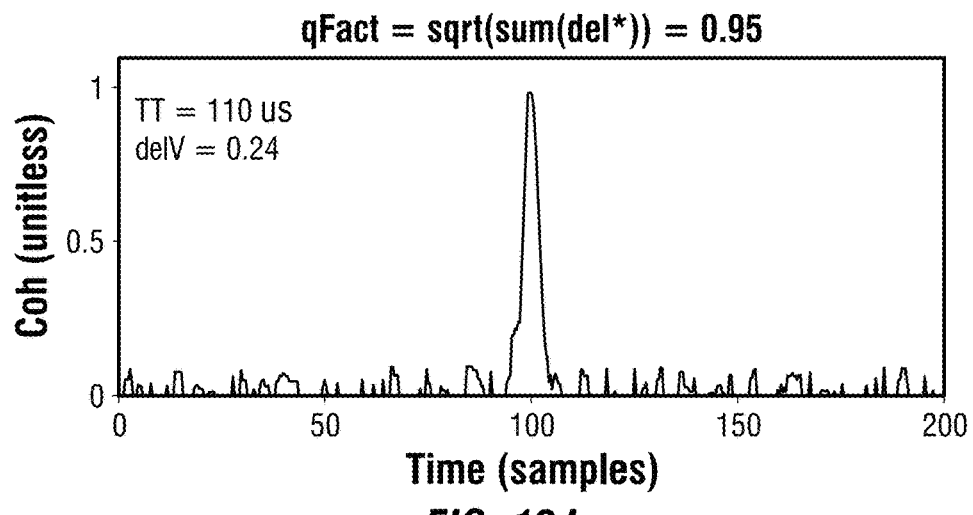
Figure 12K:
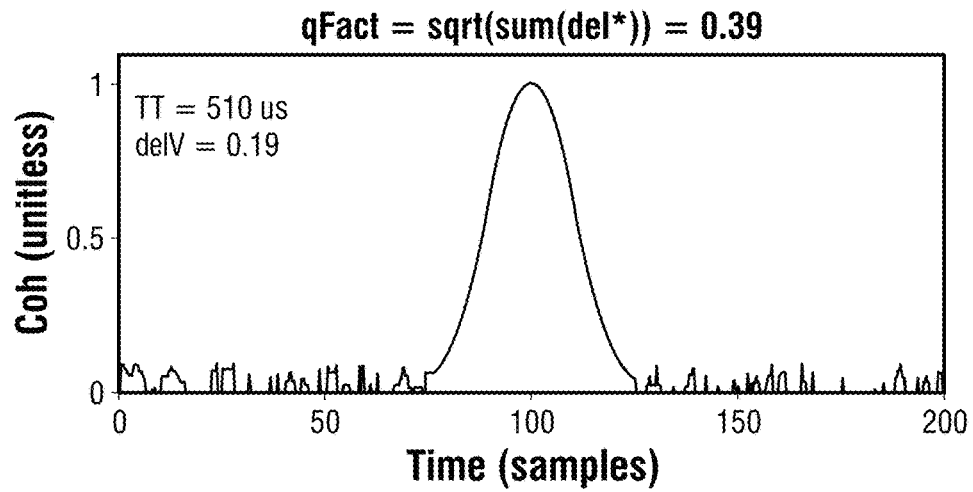
Figure 12L:
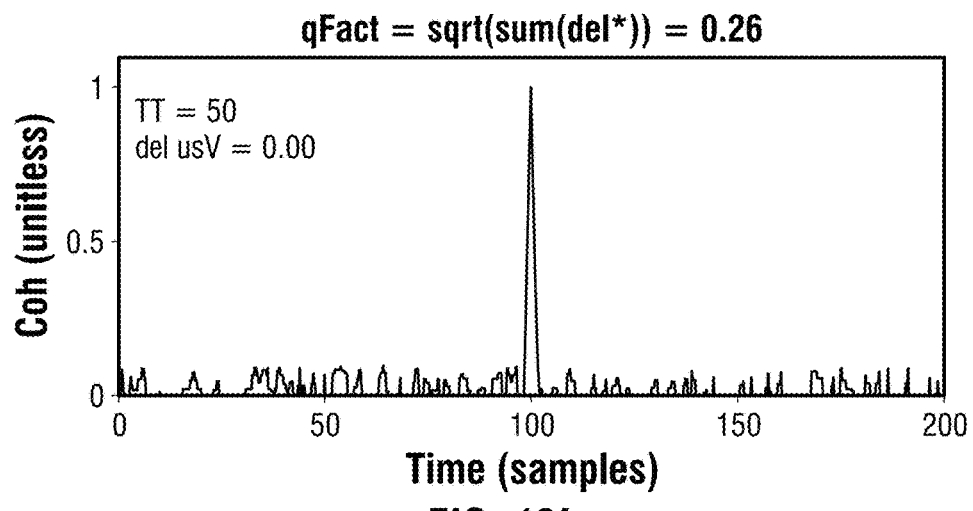

Referring back to FIG. 3, although DTRS may be picked directly in module 314, in examples, after the DTC may be picked in step 338, a new window guided by physics-based constraints may be placed around the masked 2-D map from step 328 to bracket the refracted shear slowness (DTRS) semblance signature in step 340 (FIG. 11). In step 340 an operator may create time semblance window in 2D for DTRS picking. In step 342 an operator may process and/or mask the 2D Map. In examples, the time and slowness points that define the window may be based on travel time predictions for borehole refracted waves for a range of VpVs ratio as well as information about the Stoneley wave slowness measured from another method. The range of VpVs ratios may initially come from a wide range of all possible rocks types, but as the acquisition of the log proceeds, the log may relax the extremes to conform to those observed in the accumulating training data set of DTC/DTRS pairs for the current log. When DTRS may not be available, other measurements from other tools may be used in its place. For example, dipole sonic logging provides a robust estimate of shear slowness. The Stoneley slowness from a Stoneley slowness training data set may be used to limit the upper end of the window. Candidate and optimum DTRS picks may then be made in a similar fashion using the lean-to weighting function with picks, in step 344, from creating and picking from a 1D VDL. Additionally, this process may search backwards in time across the 2-D map to the earliest possible candidate pick within the arrival's semblance signature.

Determining the quality of a slowness measurement may be challenging as there may be a variety of metrics that relate to the reliability of the DTC and DTRS measurements. After step 344, these metrics may be combined using logic thresholds to provide a single quality factor that represents the total degree of trustworthiness in step 346 to compute QC metrics. Hereinafter this metric may be identified as a "Q Factor." The Q-factor may take into account an absolute coherence value of a pick, signal-to-noise ratio of the stack waveform at a window around the pick time, VDL slowness thickness in the masked 2-D coherence map, and/or the VDL time thickness in the 2-D coherence map. This metric may be computed using:

$$Q = \text{Max}\left\{0, \frac{A - 0.2}{\sigma_A}\right\} + \text{Max}\left\{0, \text{Min}\left\{0.25, \left(\frac{B}{\sigma_B}\right)\right\}\right\} + \text{Max}\left\{0, \text{Min}\left\{0.25, 0.25\left(1 - \frac{|\sigma_C - C|^n}{\sigma_C}\right)\right\}\right\} + \text{Max}\left\{0.25, \text{Min}\left\{0.25\left(1 - \frac{|\sigma_D - D|^n}{\sigma_D}\right)\right\}\right\} \qquad (1)$$

In this non-linear equation, the four terms corresponding to A, B, C, and D, are coherence, SNR, slowness VDL thickness, and time VDL thickness, respectively. The $\sigma_*$ variables are the associated thresholds for each term, which may be determined by calibration to well logs. The value n is a coefficient determined by calibration to logs. The metric goes from 0 to 1. In general, poor picks have Q-Factors <0.4.

TABLE 1

| Term | Metric | Good | Bad |
|---|---|---|---|
| A | Coherence (unitless) | 0.5-1.0 | 0.0-0.5 |
| B | SNR (dB) | 10-70 dB | −99 to 10 dB |

TABLE 1-continued

| Term | Metric | Good | Bad |
|---|---|---|---|
| C | Slowness Thickness (us/ft) | 10-70 us/ft | 0-10 us/ft and 70-inf us/ft |
| D | Time Thickness (us) | 60-300 us | 0-60 us and 700-inf us |

FIGS. 12A-12L demonstrates some synthetic curves of what may be associated with "good" and "bad" Q factors in Table 1 above. Each column shows one of three different simulations with the total Q shown at the top of each column. The four components of the total Q are shown as rows. The value of each contributing term is shown as a del* in each graph (delCoh, delSNR, and delV). The left column represents the ideal signal with a Q factor of 0.95. The middle and right columns represent poor quality signals with total Q factors of 0.39 and 0.26, respectively.

Referring back to FIG. 3, the optimum DTC and DTRS values (that may be found from steps identified above) may represent the best choices the machine may make absent any future information. However, situations routinely arise where future information may be needed to identify the most likely correct DTC and DTRS picks. Furthermore, there may be minor jitter in the slowness logs from one depth to the next that may not be physically real, but due to a variety of things including noise and minor deviations from the assumed homogeneous, isotropic, and non-dispersive formation. To eliminate these jumps as well as smooth out minor deviations that are not real, an outlier rejection and replacement method may be implemented that uses unsupervised machine learning based on either an imported history from other wells or the history from previous acquisitions in the current well.

Figure 13C:
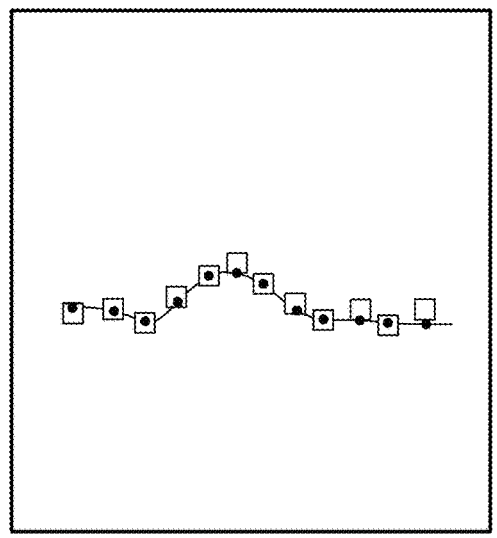
FIGS. 13A-13C are graphs illustrating the definition of outliers.
Figure 13B:
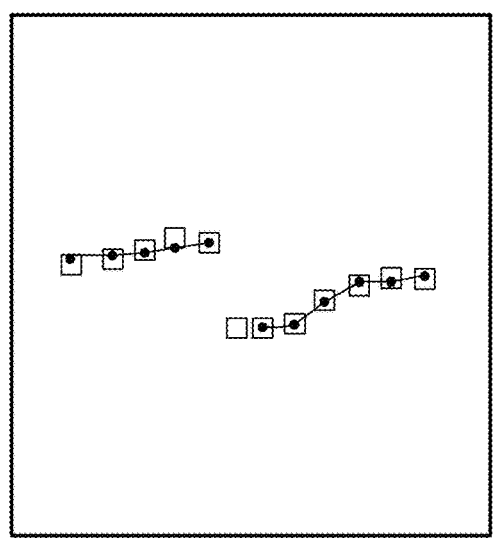
Figure 13A:
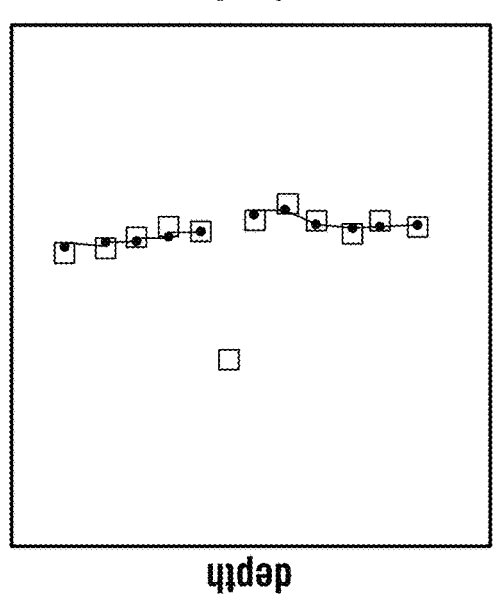

Once the final DTRS may be picked in step 344, in step 348 an operator may apply an outlier rejection and/or smoothing to DTC and DTRS logs. Outlier rejection methods may define outliers as isolated values in terms of their slowness and other associated properties such as time, signal-to-noise ratio, and Q factors. As illustrated in FIGS. 13A-13C, all DTC and DTRS values may be classified as belonging to one of four classes: outlier, top coherent track, below coherent track, or single continuous track spanning top and bottom.

Figure 14C:
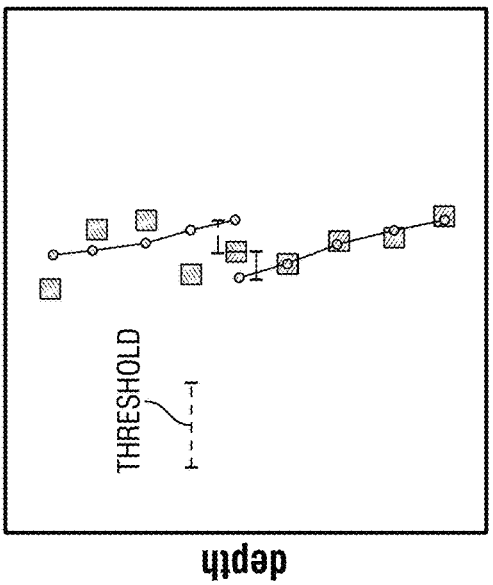
FIGS. 14A-14C are graphs of a data-adaptive, outlier rejection and smoothing method.
Figure 14B:
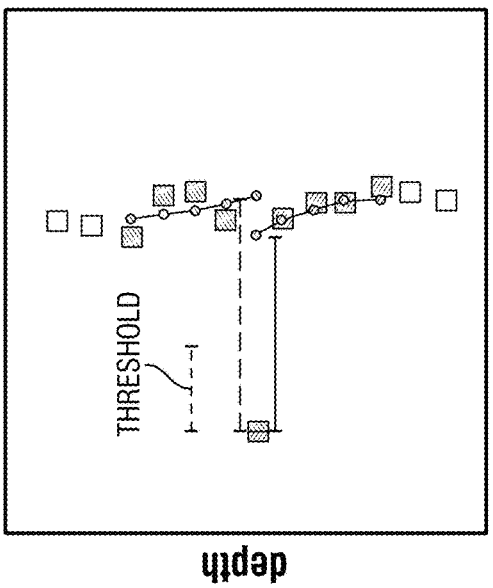
Figure 14A:
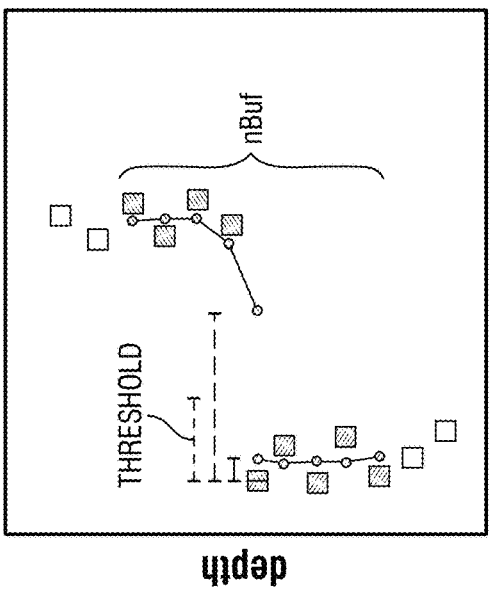

FIGS. 14A-14C illustrates an unsupervised machine learning method that may perform this classification by using a data set of a threshold length (which may change dynamically depending on the history of machine learning) into the future and past. This may be identified as an array of values, one value for each depth where the "test value" may be located at the center of the array.

The first step may be to determine which values in the data set may comprise the training data set. This may be performed by a machine learning cluster analysis that associates raw points into groups which have similar first derivatives absolute values. Any point that has a first derivative that may be beyond some relative threshold may be discarded from the training data set.

As illustrated in FIGS. 14A-14C, the next step may be to use the training data set to classify the test datum as belonging to one of the four previously mentioned groups. This classification may be performed by performing a regression analysis on the top half and bottom half of the array, separately. Both separate regressions may not include the test datum, but may predict it instead. Then the prediction may be compared to the observed datum with respect to the mean of the first derivative. If the observed datum may be outside a threshold of both predictions in this light, then it may be identified as an outlier and subsequently rejected (e.g., FIG. 14B). If the observed datum is inside both thresholds, it belongs to a single coherent track spanning both halves (e.g., FIG. 14C). Otherwise, the observed datum may be classified as belonging to either the top coherent track or bottom coherent track (e.g., FIG. 14A). If the current datum is not rejected, it may also be smoothed simply by replacing the observed value with the predicted value.

As illustrated in FIGS. 13A-13C and 14A-14C, an outlier rejection method may be explained in the context of sonic logging "slowness" values, which vary with depth. This outlier rejection method may not only be relevant to slowness, but also other slowness associated properties such as, but not limited to, pick times, amplitudes, instantaneous frequencies, signal-to-noise, and Q factors. Just as our brains view outliers in these different spaces to determine if the selected slowness value may be reliable, integrating all of these spaces into a numerical method that "learns" what the current noise levels are in each space is a means of AI-assisted slowness picking.

Referring back to FIG. 3, after step 348, in step 350 if DTC is rejected replace with another candidate if possible. In examples, machine learning may also replace the slowness values that were rejected as outliers with any possible candidates from the candidate pick arrays. This may be accomplished by saving the candidate picks at each depth that were not flagged as an outlier into a training data set. A similar length buffer holds this training data set as in FIG. 14. The test datum at the center of the buffer cycles across all possible candidates for that test depth. For each test datum, the predicted values of the regression from the upper and lower halves may be compared with the test candidate value. The cumulative difference between predicted and observed picks for all trial candidates may be saved. The process may also be performed for certain associated properties such as pick time, signal-to-noise ratio, and Q factor, again saving all the misfits. Each of the misfit arrays may be normalized by some threshold factor and summed into one misfit array with a length equal to the number of candidate picks for that depth. The pick with the smallest misfit that also is within the thresholds of suitability that define an outlier may be selected as the replacement value. Subsequent smoothing may also be applied. This machine learning is performed on both DTC and DTRS and in step 352 a final DTC and DTRS value and associated data products may be determined.

One advantage of the outlier rejection, replacement, and smoothing method in FIG. 14 may be that the outlier rejection recognizes the difference between jumping to a random slowness versus jumping to a slowness associated with a coherent change in geology. Therefore, the smoothing that may be performed to remove jitter may be fully capable of perfectly preserving the sharpness of sharp slowness jumps across geological boundaries, making it well suited for high-resolution sonic logging methods. It should be noted that "sharpness" and/or "sharp" is defined as the difference between the first measurement and the second measurement is greater than 10%.

Another advantage of this method may be that as an operator may collect data with a well measurement system 100 (e.g., Referring to FIG. 1), another process may use the computed means of the derivatives to adaptively change the outlier-rejection (and smoothing) thresholds and parameters. In fact, because characteristics at one well often may be very similar to those observed at other wells in the same basin, machine learning knowledge acquired in one well may be imported to other real-time logging systems for new wells that remain to be acquired from the same basin. This reduces the need for human interaction and the sensitivity of adaptive systems to well-specific data quality issues.

Following step 352, certain information including, but not limited to, DTC and DTRS as well as their current validation status, may be saved into a historical buffer in step 354. This information may be used during the next acquisition in various steps, especially steps 332 and 336.

The method and systems described above may add improvements to the field by computing the compressional first arrival DTC that leverages the advantages of two different sets of logic, one using first arrivals as a constraint and the other using pure-semblance with special weighting functions that are adaptively created and utilizing guidance from artificial intelligence. The resulting DTC and DTRS curves may be synthesized by comparing the values from both sets of logic. In most cases when conditions may be nominal, both methods give the same DTC within ~1% of each other, and the selection of which DTC may be the best may be determined by taking that value that provides the most continuous log (in this case, ~50% of the values may be from the first-arrival based logic and ~50% are from the pure-semblance based logic). However, when the compressional arrival signal in the waveforms has a weak amplitude or may be buried in high road noise, or when the first arrival is casing or the direct arrival (in relatively large boreholes), the pure-semblance logic may be the only logic that reports the correct DTC value. Therefore, in examples the use of both sets of logic together in parallel may be beneficial.

This method uses physics-guided machine learning techniques in limited capacities (specifically cluster analysis, feature classification, statistically-based decisions, pattern recognition, and fuzzy logic) to make automated decisions surrounding sonic logging in real-time. These decisions may be related to distinguishing between compressional, shear, and Stoneley slowness tracks. They may also be related to distinguishing between noise, model assumption failures (like picking the Airy phase instead of the first arrival slowness), and jumps in slowness due to formation changes.

Figure 15B:
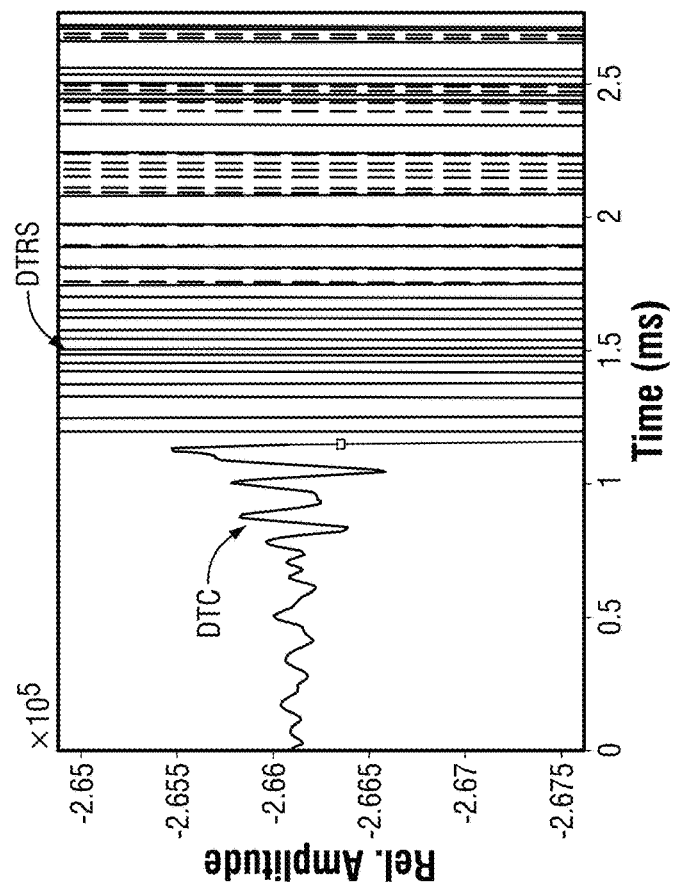
FIGS. 15A and 15B are a graph showing simulation of a depth zone with very weak P-wave signal-to-noise ratio.
Figure 15A:
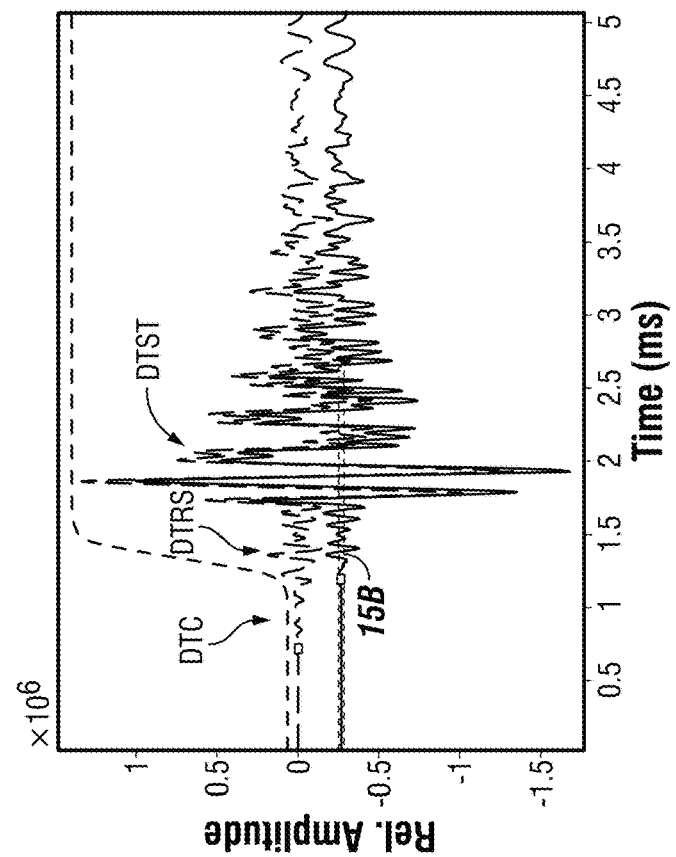

To demonstrate this method, well log data may be acquired from a 13-receiver acoustic borehole tool in a fast to medium speed formation in eastern Texas. One depth range may be isolated along this up-log and create a hyperbolic tangent taper function to attenuate all energy prior to the refracted shear arrival by ~40 dB (FIGS. 15A and 15B). FIG. 15A is a graph showing simulation of a depth zone with very weak P-wave signal-to-noise ratio. To compensate for the reduction of pre-arrival noise by the taper, a ~40 dB noise may be added in the same frequency pass band as the data. This effectively simulates the problem of a first arrival with very low signal-to-noise ratio, such as that due to high road noise or high levels of signal attenuation.

Figure 16:
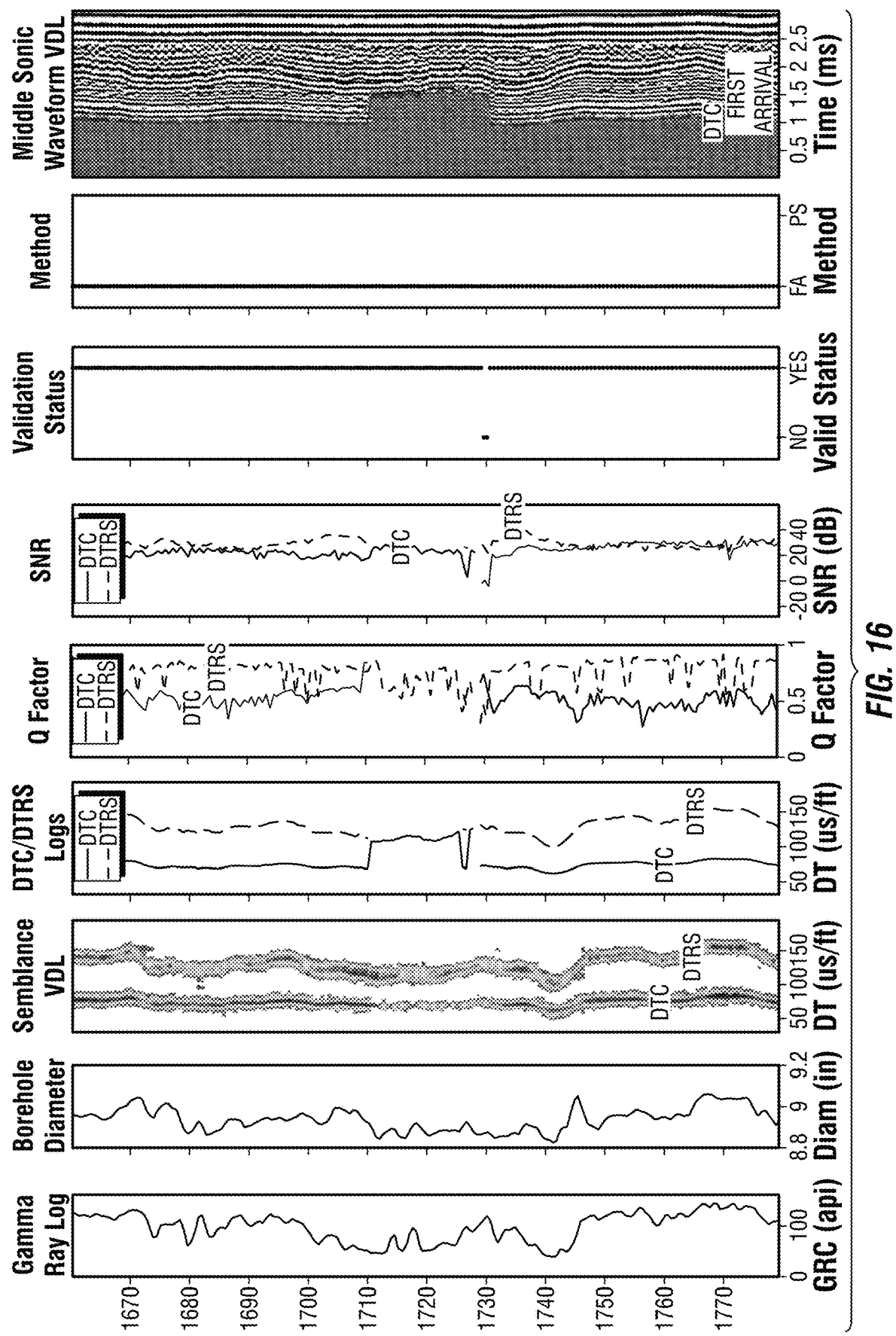
FIG. 16 shows the results of monopole sonic logging using the traditional method of first arrival constraints (right side of workflow in FIG. 3.

FIG. 16 shows the traditional method of using first arrivals to constrain the location of the time semblance map to pick the first arrival associated with DTC. This represents the right half of the workflow in FIG. 3.

In the depth range of 1710 to 1730', the edge detection may not be successful as the first arrival has an amplitude that may be at the same level as the background pre-arrival noise. Track 9 shows the first arrival curve as a function of depth. In the problematic depth range, the first arrival that may be picked may be that of the refracted shear, and the associated DTRS slowness may be incorrectly assigned to DTC (track 4). In examples, FIG. 15 B illustrate how the first arrival picks jump to refracted shear.

Although the true first arrivals may not be correctly identified in the problematic depth range, there may still be significant DTC coherence between 0.3 and 0.4 (track 3). This may be due to a coherent averaging theory, where the signal-to-noise level gain achieved by processing n receivers is equal to the 10 log(n). In fact, the noise level may be even higher and bury the DTC signal, while yielding a significant coherence between 0.2 and 0.3.

Figure 17:
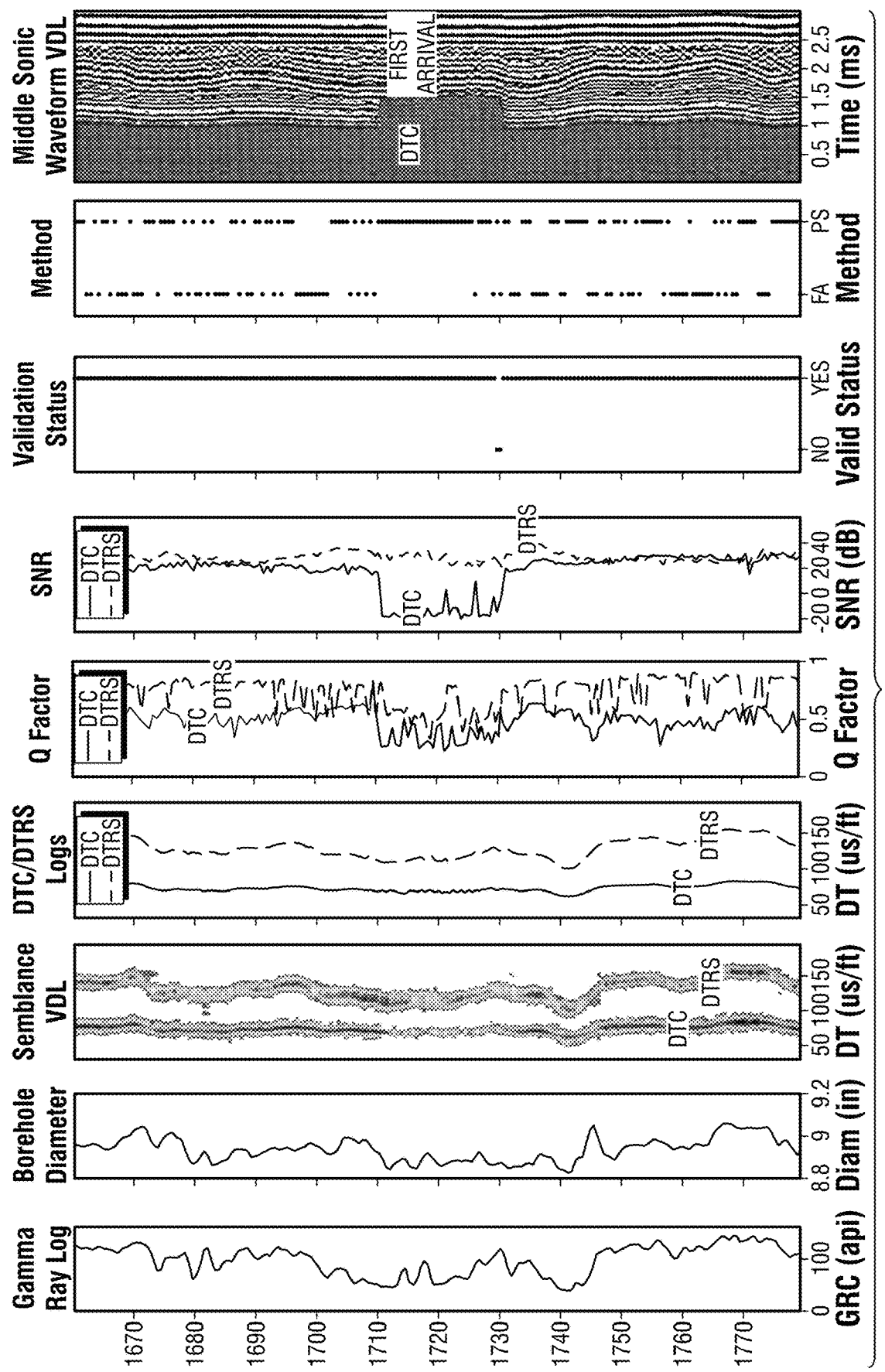
FIG. 17 shows the same example as in FIG. 18, but using the artificial intelligence workflow shown in FIG. 3.

FIG. 17 shows that the artificial intelligence presented in FIG. 3 determined that the first-arrival DTC estimates may be incorrect and that the pure-semblance DTC estimates may likely be correct. Specifically, DTRS may be present in this log, in part permitting the DTC log to achieve validation status before entering the problematic depth range (track 7). This enables the historical buffer below the depth zone to be deemed reliable, which in part led to the determination that the first arrival DTC estimate may be incorrect beginning at 1730'. In this problematic depth range, the workflow therefore outputs the pure-semblance (PS) slowness picks and their associated times (track 8), which achieves a continuous DTC slowness log (track 4).

The outlier rejection/replacement/smoothing processes in steps 348 and 350 are not applied for demonstrative purposes. Note that as shown in track 9, jitter in the DTC time picks does not imply the same level of jitter in slowness. For non-dispersive arrivals, slowness and time are decoupled observables. One gets minor variations in coherence as a function of time at the optimum DTC slowness as one goes across the compressional refraction coda due to fluctuating signal-to-noise ratio with time. From one tool position to the next, these minor variations often cause the times of these maximum coherences to move, but the slowness remains constant. Nonetheless, there is minor jitter in the slowness log in this depth range that may be smoothed by the smoothing process.

It should also be noted that the correct identification of DTC and DTRS in FIG. 17 permits the signal-to-noise ratio and Q factors to make sense. The DTC arrival was attenuated by ~40 dB (FIGS. 15A and 15B), which shows up now in track 6 as a similar drop in SNR. The Q factors also show a higher quality for DTC than DTRS measurements, except in the attenuation zone. Any Q factor less than 0.3 should be considered suspect (FIG. 12).

The process of validating and invalidating the DTC measurement may be important for workflow 300 in FIG. 3. There may be alternative waves to achieve validation status. If DTRS is expected to not exist, an operator may manually instruct the algorithm to validate the DTC log value at a particular depth. In examples, additional information may be used to provide from other logs like a dipole shear slowness or a simulated DTRS (from machine learning for example) as a substitute for DTRS. In examples, an operator may compute a probability distribution function of all DTC candidates once the buffer has filled up to estimate the most likely correct DTC to use for initial validation. In examples, an operator may assume that most of the time, the correct DTC arrival may be found when both first arrival and pure-semblance yield the same DTC. Once validation status may be achieved, the historical buffer may be used to lock onto the semblance signal of interest and navigate through higher levels of noise or other competing arrivals, such as a casing arrival or energetic areas along the dispersive leaky P wave train.

As per workflow 300, the final DTC log comprises slowness values from both sides of workflow 300 in FIG. 3. Track 8 in FIG. 17 shows which side of the workflow the final DTC estimate was taken from. In most depth ranges, they may be split into roughly equal proportions. As mentioned earlier, when both sides of the workflow yield similar answers, a final answer may be selected that maximizes the continuity from one depth to the next. This provides a natural smoothing effect, reducing jitter without needing an arbitrary smoothing filter.

Figure 18:
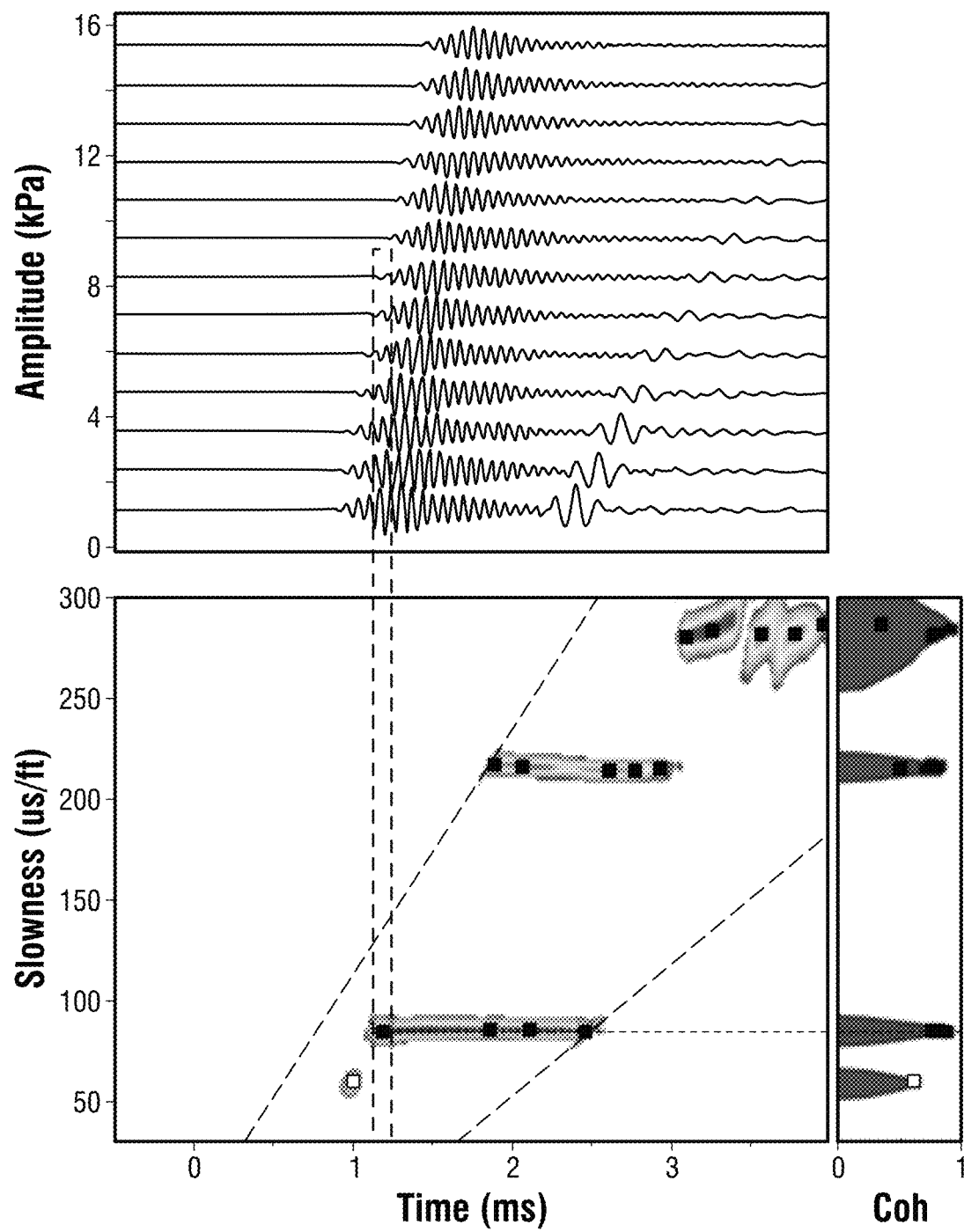
FIG. 18 are graphs illustrating an example of selecting a purse semblance DTC pick from a very fast formation in tight gas sands.
Figure 19:
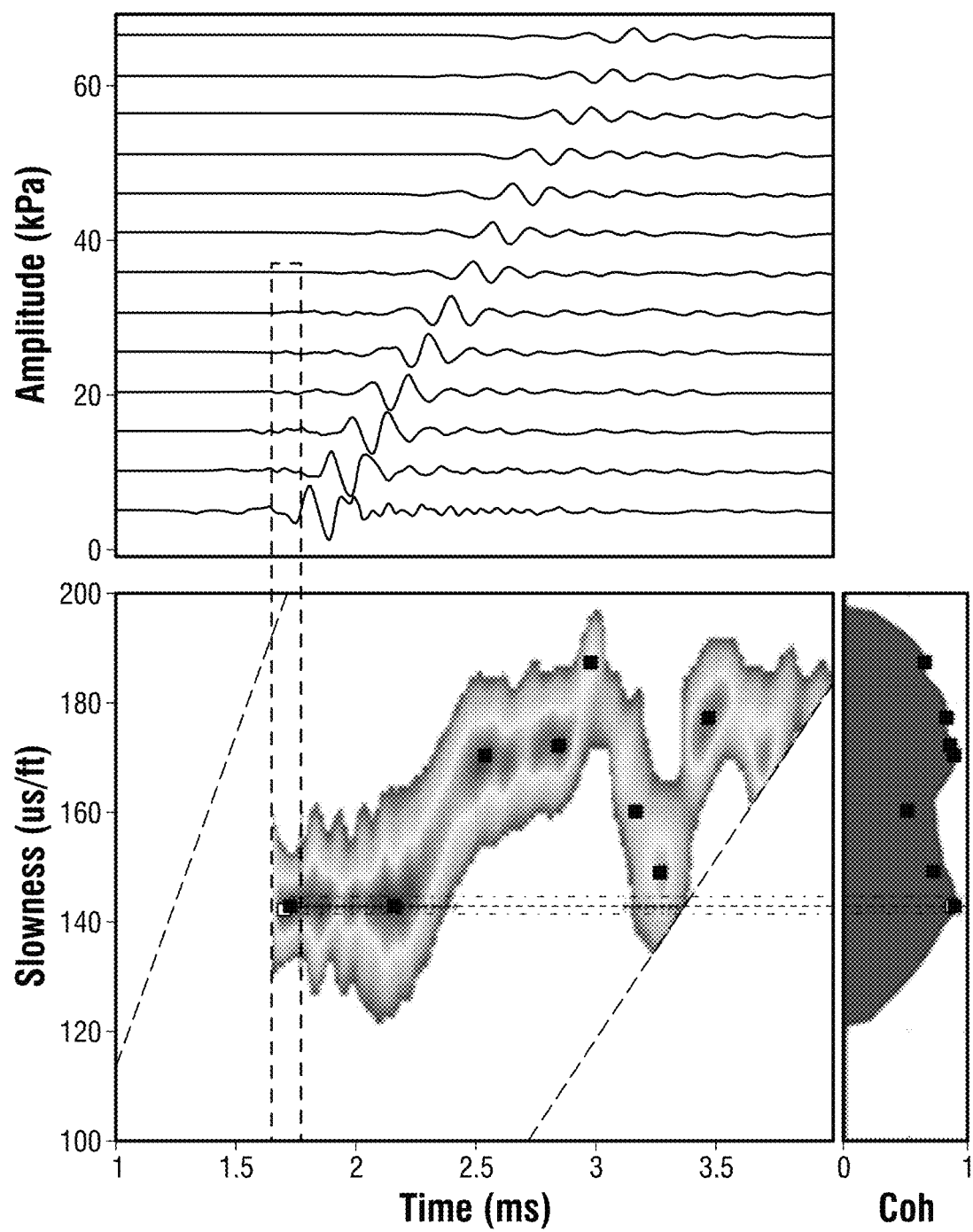
FIG. 19 are graphs illustrating another example of selecting a purse semblance DTC pick from a slow formation.

In additional examples of real well data, two DTC measurements from first arrival-based module 312 and pure semblance module 314 approaches are measured in FIGS. 18 and 19. The first example takes measurements from a very fast formation with tight gas sands. The well may be deviated and has moderate levels of road noise across a broad frequency band. The first arrival may not be detected because the DTC arrival may be buried in the noise. Consequently, the first-arrival detected is actually DTRS, and the signal that was consequently assigned to DTC was DTRS at 85 us/ft (black "x"). However, the PS approach was not incorrectly guided by the first arrivals, and with guidance provided by the weighting functions, it sees the correct DTC signal with a coherence of about 0.3 (white square). The logic in the decision tree in FIG. 10 determines that the PS DTC measurement is correct, 1.

FIG. 19 illustrates an example measurement from a soft formation. In this example, the first arrival is well defined and the FA method picks DTC correctly. The semblance is also well defined, and even though the highest coherence pick arrives later in time at 2.2 milliseconds, the PS method correctly picked the optimum pick at 1.7 milliseconds. Both methods therefore yielded consistent DTC measurements demonstrating that the PS method's tracking down to the earliest possible pick works correctly and that first-arrival picking is an optional module in FIG. 3. It should be noted that an operator may be defined as an individual, group of individuals, or an organization.

Improvements over current techniques may be found using wellbore properties sensitive to lithology, heterogeneity, porosity, stress, pore pressure, fracture density, and type of fluid occupying the pore space in real-time to make drilling decisions. For example, if a slow DTC values suggest an unexpected decrease in pore pressure, due to prior depletion for example, drilling may be stopped before a hydraulic fracture and lost circulation occurs. Sonic logging may also be used in wireline scenarios, for example, to distinguish between different lithologies as well as bridge the gap in scale between vertical seismic profiling (VSP) and properties measured via analysis of cores. This information may allow an operator to select well operations that may assist in increasing production in a wellbore. For example, well operation may include, but is not limited to, chemical treatments, fracking, gas injections, thermal injections, fire flooding, polymer flooding, and/or the like. These well operations may help in the effective and efficient removal of desirable fluids from a formation.

This method and system may include any of the various features of the compositions, methods, and system disclosed herein, including one or more of the following statements.

Statement 1. A method for measuring a compressional and a shear slowness may comprise disposing a downhole tool into a wellbore. The downhole tool comprise a transmitter configured to transmit a sonic waveform into a formation, wherein the transmitter is a monopole, and a receiver configured to record a response from a borehole, wherein the receiver is a monopole receiver. The method may further comprise broadcasting the sonic waveform into the formation penetrated by the wellbore, recording a reflected wave on one or more receivers, wherein the reflected wave is a compressional wave or a shear wave, processing the reflected wave into at least one measurement, applying a validation scheme to the at least one measurement, and applying an artificial intelligence to select a slowness from a first arrival based module or a pure semblance based module.

Statement 2. The method of statement 1, wherein the processing of the reflected wave is the pure semblance module.

Statement 3. The method of statements 1 or 2, wherein the processing of the reflected wave is a semblance scheme that is constrained by the first arrival measurement.

Statement 4. The method of statements 1 to 3, further comprising measuring a delay of the waveform during the broadcasting.

Statement 5. The method of statements 1 to 4, further comprising measuring a duration of the broadcasted waveform.

Statement 6. The method of statements 1 to 5, further comprising using a time-slowness mask that adapts to borehole conditions to isolate signals of interest from interfering signals and road noise.

Statement 7. The method of statements 1 to 6, wherein the select the slowness is performed in a 2-D time/slowness domains.

Statement 8. The method of statements 1 to 7, wherein the select the slowness is guided by a weighting function.

Statement 9. The method of statements 1 to 8, wherein the weighting function has an exponential form.

Statement 10. The method of statements 1 to 8, wherein the weighting function includes a history of previous measurements.

Statement 11. The method of statements 1 to 8, wherein the weighting function has a monotonically decreasing form.

Statement 12. The method of statements 1 to 8, wherein the weighting function is defined over both slowness and time domains.

Statement 13. The method of statements 1 to 8, further comprising a series of signal properties that are measured at time semblance 2-D map points.

Statement 14. The method of statements 1 to 8 and 13, wherein at least one of the series of signal properties is a signal-to-noise ratio.

Statement 15. The method of statements 1 to 8, 13, and 14, wherein a time-slowness property map is used to define a mask to isolate a signal of interest from an interfering signals and a road noise.

Statement 16. The method of statements 1 to 8 and 13 to 15, wherein the select the slowness is guided by a 2-D map projection to a slowness axis from a second broadcasting from a second transmitter.

Statement 17. The method of statements 1 to 8 and 13 to 16, wherein the 2-D map projection to slowness axes is combined by averaging into a projection.

Statement 18. The method of statements 1 to 8 and 13 to 17, further comprising applying an outlier rejection scheme that uses machine learning on a data set with a past and a future data to identify primary values to replace with an alternative candidate values.

Statement 19. The method of statements 1 to 8 and 13 to 18, further comprising applying a smoothing filter that preserves sharp edges due to coherent changes in a geology.

Statement 20. The method of statements 1 to 8 and 13 to 19, wherein the data set analyzed include primary and candidate formation slowness values selected from a second sonic waveform from a second transmitter.

Statement 21. The method of statements 1 to 8 and 13 to 20, further comprising evaluating the slowness with a metric that synthesizes a coherence value, a signal-to-noise ratio, a slowness thickness in a 2-D coherence map, and a time thickness in the 2-D coherence map.

Statement 22. The method of statements 1 to 8 and 13 to 21, wherein the validation scheme utilizes a decision tree.

Statement 23. The method of statements 1 to 8 and 13 to 22, wherein the artificial intelligence to select the slowness from a first arrival based module or a pure semblance based module utilizes a decision tree.

Statement 24. A system for measuring a compressional and a shear slowness may comprise a downhole tool. The downhole tool may comprise a transmitter configured to transmit a sonic waveform into a formation, wherein the transmitter is a monopole, and a receiver configured to record a reflected wave, wherein the receiver is a monopole receiver. The system may further comprise an information handling system. The information handling system may be configured to process the reflected wave into at least one measurement, apply a validation scheme to the at least one measurement, and select a slowness from a first arrival based module or a pure semblance based module.

Statement 25. The system of statement 24, wherein the receiver is further configured to measure a delay of the waveform during the broadcasting.

Statement 26. The system of statements 24 or 25, wherein the receiver is further configured to measure a duration of the broadcasted waveform.

Statement 27. The system of statements 24 to 26, wherein the information handling system is further configured to apply an outlier rejection scheme that uses machine learning on a data set with a past and a future data to identify primary values to replace with an alternative candidate values.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for measuring a compressional and a shear slowness comprising:
    disposing a downhole tool into a wellbore, wherein the downhole tool comprises:
        a transmitter configured to transmit a sonic waveform into a formation, wherein the transmitter is a monopole; and
        a receiver configured to record a response from a borehole, wherein the receiver is a monopole receiver;
    broadcasting the sonic waveform into the formation penetrated by the wellbore;
    recording a reflected wave on one or more receivers, wherein the reflected wave is a compressional wave or a shear wave;
    processing the reflected wave into at least one measurement;
    applying a first arrival based module on the at least one measurement to determine a slowness;
    applying a pure semblance based module on the at least one measurement to determine a slowness; and
    applying an artificial intelligence to select a slowness from the first arrival based module or the pure semblance based module.

2. The method of claim 1, wherein the processing of the reflected wave is the pure semblance based module.

3. The method of claim 1, wherein the processing of the reflected wave is a semblance scheme that is constrained by the first arrival measurement.

4. The method of claim 1, further comprising measuring a delay of the waveform during the broadcasting.

5. The method of claim 4, further comprising measuring a duration of the broadcasted waveform.

6. The method of claim 1, further comprising using a time-slowness mask that adapts to borehole conditions to isolate signals of interest from interfering signals and road noise.

7. The method of claim 1, wherein the select the slowness is performed in a 2-D time/slowness domains.

8. The method of claim 7, wherein the select the slowness is guided by a weighting function.

9. The method of claim 8, wherein the weighting function has an exponential form.

10. The method of claim 8, wherein the weighting function includes a history of previous measurements.

11. The method of claim 8, wherein the weighting function has a monotonically decreasing form.

12. The method of claim 8, wherein the weighting function is defined over both slowness and time domains.

13. The method of claim 7, further comprising a series of signal properties that are measured at time semblance 2-D map points.

14. The method of claim 13, wherein at least one of the series of signal properties is a signal-to-noise ratio.

15. The method of claim 13, wherein a time-slowness property map is used to define a mask to isolate a signal of interest from an interfering signals and a road noise.

16. The method of claim 7, wherein the select the slowness is guided by a 2-D map projection to a slowness axis from a second broadcasting from a second transmitter.

17. The method of claim 16, wherein the 2-D map projection to slowness axes is combined by averaging into a projection.

18. The method of claim 1, further comprising applying an outlier rejection scheme that uses machine learning on a data set with a past and a future data to identify primary values to replace with an alternative candidate values.

19. The method of claim 18, further comprising applying a smoothing filter that preserves sharp edges due to coherent changes in a geology.

20. The method of claim 18, wherein the data set analyzed include primary and candidate formation slowness values selected from a second sonic waveform from a second transmitter.

21. The method of claim 1, further comprising evaluating the slowness with a metric that synthesizes a coherence value, a signal-to-noise ratio, a slowness thickness in a 2-D coherence map, and a time thickness in the 2-D coherence map.

22. The method of claim 1, wherein the applying a pure semblance based module further comprises applying a validation scheme which utilizes a decision tree.

23. The method of claim 1, wherein the artificial intelligence to select the slowness from a first arrival based module or a pure semblance based module utilizes a decision tree.

24. A system for measuring a compressional and a shear slowness comprising:
 a downhole tool comprising:
  a transmitter configured to transmit a sonic waveform into a formation, wherein the transmitter is a monopole; and
  a receiver configured to record a reflected wave, wherein the receiver is a monopole receiver;
 an information handling system configured to:
  process the reflected wave into at least one measurement;
  apply a first arrival based module on the at least one measurement to determine a slowness;
  apply a pure semblance based module on the at least one measurement to determine a slowness; and; and
  apply an artificial intelligence to select a slowness from the first arrival based module or the pure semblance based module.

25. The method of claim 24, wherein the receiver is further configured to measure a delay of the waveform during the broadcasting.

26. The method of claim 24, wherein the receiver is further configured to measure a duration of the broadcasted waveform.

27. The method of claim 24, wherein the information handling system is further configured to apply an outlier rejection scheme that uses machine learning on a data set with a past and a future data to identify primary values to replace with an alternative candidate values.

* * * * *